(12) United States Patent
Wada et al.

(10) Patent No.: US 6,480,454 B1
(45) Date of Patent: Nov. 12, 2002

(54) OPTICAL ELEMENT, OPTICAL HEAD USING THE OPTICAL ELEMENT, AND OPTICAL RECORDING AND REPRODUCING APPARATUS USING THE OPTICAL ELEMENT

(75) Inventors: Hidenori Wada, Osaka (JP); Daisuke Ogata, Hyogo (JP); Sadao Mizuno, Osaka (JP); Seiji Nishino, Osaka (JP); Tetsuo Saimi, Osaka (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 0 days.

(21) Appl. No.: 09/460,128

(22) Filed: Dec. 13, 1999

(30) Foreign Application Priority Data

Dec. 15, 1998 (JP) ............................. 10-355677
Dec. 18, 1998 (JP) ............................. 10-360545

(51) Int. Cl.$^7$ ................................. G11B 7/00
(52) U.S. Cl. ................................. 369/112.02
(58) Field of Search .................. 369/112.02, 44.23, 369/118, 44.32, 53.19

(56) References Cited

U.S. PATENT DOCUMENTS

| 5,668,657 A | | 9/1997 | Talbot | |
| 5,734,637 A | * | 3/1998 | Ootaki et al. | 369/112.02 |
| 5,793,735 A | | 8/1998 | Oono | |
| 5,859,818 A | | 1/1999 | Tateishi et al. | |
| 5,914,923 A | | 6/1999 | Araki et al. | |
| 5,936,923 A | | 8/1999 | Ootaki et al. | |
| 6,078,554 A | * | 6/2000 | Ootaki et al. | 369/112.02 |
| 6,137,754 A | * | 10/2000 | Furukawa et al. | 369/112.02 |
| 6,141,304 A | * | 10/2000 | Ogasawara | 369/112.02 |

FOREIGN PATENT DOCUMENTS

| EP | 0 565 381 A2 | 10/1992 |
| JP | 04 166839 A | 6/1992 |
| JP | 10-20263 | 1/1998 |
| JP | 10 208286 A | 8/1998 |
| JP | 10-247330 | 9/1998 |
| JP | 10-289465 | 10/1998 |
| JP | 11-110802 | 4/1999 |

OTHER PUBLICATIONS

Ohtaki et al. "Application of Liquid Crystal to an Optical Head for Optical Discs". *Technical Report*, vol. 21 No. 50. pp. 1–6.
Asakurashoten "Electromagnetics". p. 84 11. 8–14.

* cited by examiner

Primary Examiner—Thang V. Tran
(74) Attorney, Agent, or Firm—Merchant & Gould P.C.

(57) ABSTRACT

The invention presents an optical element that has a good correcting effect with regard to aberrations and is easy to manufacture, as well as an optical head and an optical recording and reproducing apparatus using the same. The optical element includes a first substrate, a second substrate arranged substantially in parallel to the first substrate, a voltage applying electrode arranged between the first substrate and a liquid crystal, an opposing electrode arranged substantially in parallel to the voltage applying electrode and opposing the voltage applying electrode, and a liquid crystal arranged between the first substrate and the second substrate. By changing the voltage between the voltage applying electrode and the opposing electrode, the phase of the light incident on the liquid crystal can be changed.

44 Claims, 28 Drawing Sheets

OPTICAL ELEMENT, OPTICAL HEAD USING THE OPTICAL ELEMENT, AND OPTICAL RECORDING AND REPRODUCING APPARATUS USING THE OPTICAL ELEMENT

BACKGROUND OF THE INVENTION

1. Field of the Invention

The present invention relates to optical element that changes the phase of an incident light beam and to an optical head and an optical recording and reproducing apparatus using such an optical element.

2. Description of the Prior Art

Optical recording media, such as digital versatile disks (DVDs), can record digital information with high densities, so that they are noted as optical recording media with large capacities. To record and reproduce digital information with high densities, it is necessary to use short wavelength light for recording and reproducing, and make the NA (numerical aperture) of the objective lens large. However, making the wavelength short and the NA of the lens large increases the wave-front aberrations, in particular coma aberration, due to deviations (tilt) from the optical axis, for example caused by warps in the optical recording medium, and there is the problem that the system design margins for the tilt have to be reduced.

In order to solve this problem, optical heads correcting the wave-front aberrations with a liquid crystal panel have been proposed (see e.g. Japanese Patent Application (Tokkai) Hei 9-128785).

Referring to FIG. 23, the following explains an example of such a conventional head.

FIG. 23 shows the configuration of a conventional optical head 1 (also called "optical pickup"). The optical head 1 comprises a light source 2, a half-mirror 3a, an objective lens 3b, a focus lens 3c, an optical element 4, a tilt sensor 5, an optical element control circuit 6, and a photo-detector 7.

The light source 2, which can be a semiconductor laser element, outputs coherent light for recording and reproducing toward the recording layer of the optical recording medium 8 (which is a medium for recording information, in which the recorded information can be read out optically, such as a CD or a DVD). The optical element 4 includes a liquid crystal panel, which has a plurality of segment electrodes in a pattern such as shown in FIG. 24. By applying an appropriate voltage to each of the segment electrodes, the optical element 4 changes the refractive index of the liquid crystal for each of the segment electrodes, and changes the phase of the light passing through each of the electrodes. Thus, the optical element 4 corrects the aberration caused by the tilt.

The following explains how this conventional optical head 1 functions. Linearly polarized light emitted by the light source 2 is reflected by the half-mirror 3a and enters the optical element 4. When the optical recording medium 8 is tilted vertically with respect to the optical axis, a signal depending on the tilt amount (tilt angle) is output by the tilt sensor 5. Based on the signal from the tilt sensor 5, the optical element control circuit 6 controls the liquid crystal panel of the optical element 4 so as to generate the necessary phase change for correcting the wave-front aberrations caused when the optical recording medium is tilted.

Thus, the light entering the optical element 4 is subjected to a phase change that corrects the wave-front aberrations caused by tilting of the optical recording medium 8. The light that has passed through the optical element 4 is focused on the optical recording medium 8 by an objective lens 3b. Since light that has been subjected to a phase change that corrects the wave-front aberrations caused by tilting of the optical recording medium 8 is focused by the objective lens 3b, a light spot without aberration (constricted to the diffraction limit) is formed on the optical recording medium 8.

Then, the light that is reflected from the optical recording medium 8 may turn into light with wave-front aberrations, depending on the tilt of the optical recording medium 8, but the wave-front aberrations are corrected by the optical element 4. The light that has passed through the optical element 4 passes the half-mirror 3a and enters the focus lens 3c without returning to the light source 1, and is focused by the focus lens 3c on the photo-detector 7. The photo-detector 7 outputs the information stored on the optical recording medium 8. In addition, the photo-detector 7 outputs a focus error signal indicating how well the light focuses on the optical recording medium 8, and a tracking error signal indicating the irradiation position of the light.

The following explains the principle of the tilt correction with the optical element 4.

FIG. 25 shows an example of the wave-front aberrations in the best image point of the optical recording medium 8 (for a 1° tilt angle of the optical recording medium 8, a 0.6 NA of the objective lens, a wavelength of 655 nm, and a 0.6 mm substrate thickness of the optical recording medium 8). As is shown in FIG. 25, if the optical recording medium 8 is tilted, the wave-front aberrations have a substantially semicircular distribution, anti-symetrically to the left and right. By subjecting the incident light to a phase change that cancels the wave-front aberration distribution in FIG. 25 with the optical lens 4, the spot on the optical recording medium 8 can be constricted to the diffraction limit, even when the optical recording medium 8 is tilted. Moreover, by subjecting the light that is reflected from the optical recording medium 8 to a phase change that cancels the wave-front aberrations, the photo-detection with the photo-detector 7 becomes more precise.

To subject the incident light to a phase change that cancels the wave-front aberration distribution in FIG. 25, the light path length of the optical element 4 has to be changed partially. Since the refractive index of the liquid crystal can be changed by applying a voltage from outside, the light path length of the optical element can be changed partially by partially changing the applied voltage. Thus, the wave-front aberrations shown in FIG. 25 can be corrected by applying different voltages to different segment electrodes partitioned into a fine pattern as shown in FIG. 24.

However, with such an optical element 4, it is necessary to apply a corresponding control signal from the outside to each segment electrode of the liquid crystal panel in the optical element 4. This means, that from the driving circuit for driving the liquid crystal panel, a flexible circuit board has to be connected to the optical element 4 with the same number of wires as there are segment electrodes in the liquid crystal panel. Consequently, in the case of an optical element 4 having many segment electrodes as shown in FIG. 24, many signals have to be supplied, and the flexible circuit board becomes accordingly wider. When such a wide flexible circuit board is connected to the optical element 4, it becomes very difficult to adjust the parts properly, and this stands in the way of making the optical head 1 smaller. Moreover, to install a small optical element as the optical head 4 without shorting the many wires is very difficult, and the more wires there are, the worse becomes the yield of the step of installing the optical element 4 on the flexible circuit board, which leads to higher costs for the optical head 1.

In order to solve this problem, an optical element has been proposed having segment electrodes that differ from the above conventional segment electrodes (Tokkai Hei 10-20263). FIG. 26 shows the shape of these segment electrodes. The shape of these segment electrodes agrees with the shape of the wave-front aberrations caused by tilting of the optical recording medium 8. Consequently, the wave-front aberrations can be corrected better than with the above-mentioned conventional optical element, even though the number of segment electrodes is reduced.

However, even with the optical element having segment electrodes of the shape shown in FIG. 26, the pattern shown in FIG. 26 has to be partitioned even finer to correct the wave-front aberrations more precisely. Consequently, even in an optical element having segment electrodes with the shape shown in FIG. 26, the number of control signals rises in proportion to the partitioning degree of the segment electrodes, and there is the problem that it becomes difficult to connect the optical element 4 and the optical element control circuit 6. Moreover, there is the problem that it is difficult to make the optical head smaller.

Moreover, the influence of the electric field above the portions between segment electrode and segment electrode (separation portions) is weak, so that there is the problem that the wave-front aberrations are not corrected sufficiently. It seems possible to make the separation portions narrower, but if the width of the separation portions is below a certain value, there is the problem that they become difficult to manufacture and the yield drops.

SUMMARY OF THE INVENTION

To solve these problems, it is an object of the present invention to present an optical element with a good correcting effect with regard to incident light, which is easy to manufacture, and an optical head and an optical recording and reproducing apparatus using the same.

To attain these objects, an optical element in accordance with the present invention includes a voltage applying electrode provided with a plurality of segment electrodes; an opposing electrode arranged substantially in parallel to the voltage applying electrode and opposing the voltage applying electrode; a phase changing layer made of a phase changing material arranged between the voltage applying electrode and the opposing electrode; wherein a phase of light entering the phase changing layer is changed by changing a voltage between the voltage applying electrode and the opposing electrode. With this configuration, an optical recording and reproducing apparatus with good correcting effect with regard to incident light, which is easy to manufacture, can be achieved.

In the optical element, it is preferable that the phase changing material is a material whose refractive index changes depending on the voltage. With this configuration, the phase of the incident light can be changed easily.

In the optical element, it is preferable that the phase changing material is a liquid crystal. With this configuration, the voltage applied to change the phase of the incident light can be small.

In the optical element, it is preferable that the phase changing material is a material whose volume changes depending on the voltage. With this configuration, the phase of the incident light can be changed easily.

In the optical element, it is preferable that the phase changing material is PLZT (transparent perovskite crystal containing lead oxide, lanthanum, zirconium oxide, and titanium oxide). With this configuration, the element can be made thin.

It is preferable that the voltage applying electrode further includes a voltage control electrode made of a conductive material, which divides a voltage applied from outside with resistances of the conductive material and applies the divided voltages to the segment electrodes. With this configuration, the resistances of the voltage applying electrodes divide a voltage applied from outside, so that the voltage applied from outside can be divided easily.

In the optical element, it is preferable that the plurality of segment electrodes includes a plurality of substantially semicircular electrodes arranged substantially in symmetry. With this configuration, the wave-front aberrations can be corrected easily and precisely.

In the optical element, it is preferable that the plurality of segment electrodes includes a plurality of electrodes partitioned into concentric rings. With this configuration, spherical aberration can be corrected easily and precisely.

In the optical element, it is preferable that the thickness $d_a$ of the voltage applying electrode is $$d_a = (2N_a+1)\lambda/2n_a$$

wherein $\lambda$ is the wavelength of the incident light, $N_a$ is an integer of 0 or greater, and $n_a$ is the refractive index of the voltage applying electrode. With this configuration, light reflections at the voltage applying electrode can be prevented, if the refractive indices of the layer above and below the voltage applying electrode are substantially the same.

In the optical element, it is preferable that the thickness $d_b$ of the opposing electrode is $$d_b = (2N_b+1)\lambda/2n_b$$

wherein $\lambda$ is the wavelength of the incident light, $N_b$ is an integer of 0 or greater, and $n_b$ is the refractive index of the opposing electrode. With this configuration, light reflection at the opposing electrode can be avoided, if the refractive indices of the layer above and below the opposing electrode are substantially the same.

It is preferable that the optical element further includes an anti-reflective film for preventing reflection of incident light. With this configuration, light losses due to reflection can be prevented.

In the optical element, it is preferable that the voltage applying electrode is partitioned by separation portions into the plurality of segment electrodes; and the width of the separation portions is such that the entire phase changing layer located above the separation portions is influenced by the segment electrodes. With this configuration, the phase of light passing through the portions where the segment electrode is not formed can be controlled as well, so that an optical element with a particularly high phase correction effect can be obtained.

In this optical element, it is preferable that the width W of the separation portions and the thickness d of the phase changing layer satisfy the relation $W \leq 3d$. With this configuration, an optical element with an even better phase correction effect can be obtained.

In the optical element, it is preferable that the voltage applying electrode is partitioned by separation portions into the plurality of segment electrodes; and the optical element further includes a light-blocking film blocking light from passing through the separation portions. With this configuration, light passing through the portions of the liquid crystal that are not controlled by the electric field can be blocked, so that an optical element with an even better phase correction effect can be obtained.

In this optical element, it is preferable that the light-blocking film is made of metal. With this configuration, a light-blocking film that blocks light well can be manufactured easily.

An optical head in accordance with the present invention, for optically reading information stored on an optical recording medium, includes a light source and an optical element as described above arranged between the optical recording medium and the light source. Since this optical head includes an optical element in accordance with the present invention, an optical head with good correcting effect with regard to incident light, which is easy to manufacture, can be achieved.

In this optical head, it is preferable that the phase changing material of the optical element is a material whose refractive index changes depending on the voltage.

In this optical head, it is preferable that the phase changing material is a liquid crystal.

In this optical head, it is preferable that the phase changing material of the optical element is a material whose volume changes depending on the voltage.

In this optical head, it is preferable that the phase changing material is PLZT.

In this optical head, it is preferable that the voltage applying electrode further includes a voltage control electrode made of a conductive material, which divides a voltage applied from outside with resistances of the conductive material and applies the divided voltages to the segment electrodes.

In this optical head, it is preferable that the plurality of segment electrodes includes a plurality of substantially semicircular electrodes arranged substantially in symmetry.

In this optical head, it is preferable that the plurality of segment electrodes includes a plurality of electrodes partitioned into concentric rings.

In this optical head, it is preferable that the thickness $d_a$ of the voltage applying electrode is $$d_a=(2N_a+1)\lambda/2n_a$$

wherein $\lambda$ is the wavelength of the incident light, $N_a$ is an integer of 0 or greater, and $n_a$ is the refractive index of the voltage applying electrode.

In this optical head, it is preferable that the thickness $d_b$ of the opposing electrode is $$d_b=(2N_b+1)\lambda/2n_b$$

wherein $\lambda$ is the wavelength of the incident light, $N_b$ is an integer of 0 or greater, and $n_b$ is the refractive index of the opposing electrode.

In this optical head, it is preferable that the optical element further includes an anti-reflective film for preventing reflection of incident light.

In this optical head, it is preferable that the voltage applying electrode is partitioned by separation portions into the plurality of segment electrodes; and the width of the separation portions is such that the entire phase changing layer located above the separation portions is influenced by the segment electrodes.

In this optical head, it is preferable that the width W of the separation portions and the thickness d of the phase changing layer satisfy the relation $W \leq 3d$.

In this optical head, it is preferable that the voltage applying electrode is partitioned by separation portions into the plurality of segment electrodes; and the optical element further includes a light-blocking film formed on a main surface on the outer side of the first substrate or the second substrate at a position corresponding to the separation portions.

In this optical head, it is preferable that the light-blocking film is made of metal.

It is preferable that the optical head further includes a N $\lambda$/4 plate (wherein N is an odd number of one or greater) arranged between the optical recording medium and the optical element. With this configuration, light is used with greater efficiency, facilitating the recording of signals.

An optical recording and reproducing apparatus in accordance with the present invention, for recording or reproducing signals (this includes recording and reproducing signals) on an optical recording medium, includes an optical head for recording or reproducing signals on the optical recording medium, the optical head including a light source, and an optical element as described above arranged between the optical recording medium and the light source. Since this optical recording and reproducing apparatus includes an optical element in accordance with the present invention, an optical recording and reproducing apparatus with a good correcting effect with regard to incident light, and which is easy to manufacture, can be achieved.

In the apparatus, it is preferable that the phase changing material of the optical element is a material whose refractive index changes depending on the voltage.

In the apparatus, it is preferable that the phase changing material is a liquid crystal.

In the apparatus, it is preferable that the phase changing material of the optical element is a material whose volume changes depending on the voltage.

In the apparatus, it is preferable that the phase changing material is PLZT.

In the apparatus, it is preferable that the voltage applying electrode further includes a voltage control electrode made of a conductive material, which divides a voltage applied from outside with resistances of the conductive material and applies the divided voltages to the segment electrodes.

In the apparatus, it is preferable that the plurality of segment electrodes includes a plurality of substantially semicircular electrodes arranged substantially in symmetry.

In the apparatus, it is preferable that the plurality of segment electrodes includes a plurality of electrodes partitioned into concentric rings.

In the apparatus, it is preferable that the thickness $d_a$ of the voltage applying electrode is $$d_a=(2N_a+1)\lambda/2n_a$$

wherein $\lambda$ is the wavelength of the incident light, $N_a$ is an integer of 0 or greater, and $n_a$ is the refractive index of the voltage applying electrode.

In the apparatus, it is preferable that the thickness $d_b$ of the opposing electrode is $$d_b=(2N_b+1)\lambda/2n_b$$

wherein $\lambda$ is the wavelength of the incident light, $N_b$ is an integer of 0 or greater, and $n_b$ is the refractive index of the opposing electrode.

It is preferable that the apparatus further includes an anti-reflective film for preventing reflection of incident light.

In the apparatus, it is preferable that the voltage applying electrode is partitioned by separation portions into the plurality of segment electrodes; and the width of the separation portions is such that the entire phase changing layer located above the separation portions is influenced by the segment electrodes.

In the apparatus, it is preferable that the width W of the separation portions and the thickness d of the phase changing layer satisfy the relation W≦3d.

In the apparatus, it is preferable that the voltage applying electrode is partitioned by separation portions into the plurality of segment electrodes; and the optical element further includes a light-blocking film blocking light from passing through the separation portions.

In the apparatus, it is preferable that the light-blocking film is made of metal.

It is preferable that the apparatus further includes a N λ/4 plate (wherein N is an odd number of one or greater) arranged between the light source and the optical element.

DESCRIPTION OF THE PREFERRED EMBODIMENTS

The following is a description of the preferred embodiments of the present invention, with reference to the accompanying drawings.

First Embodiment

The first embodiment illustrates an example of an optical element in accordance with the present invention.

Figure 1:
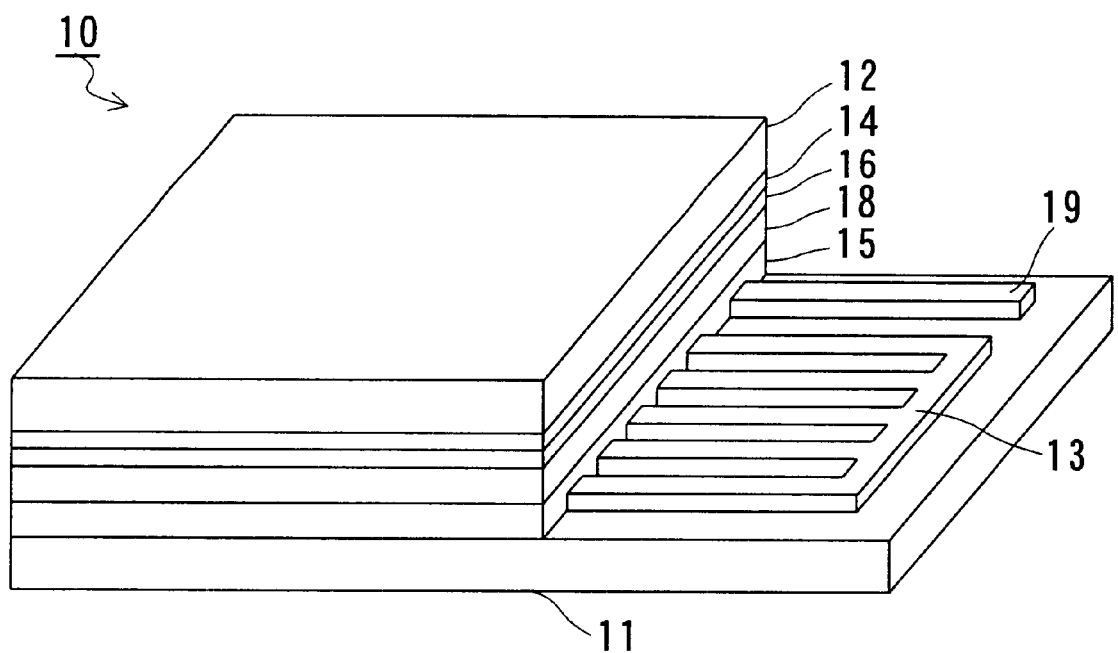
FIG. 1 is a perspective view showing an example of an optical element in accordance with the present invention.
Figure 2:
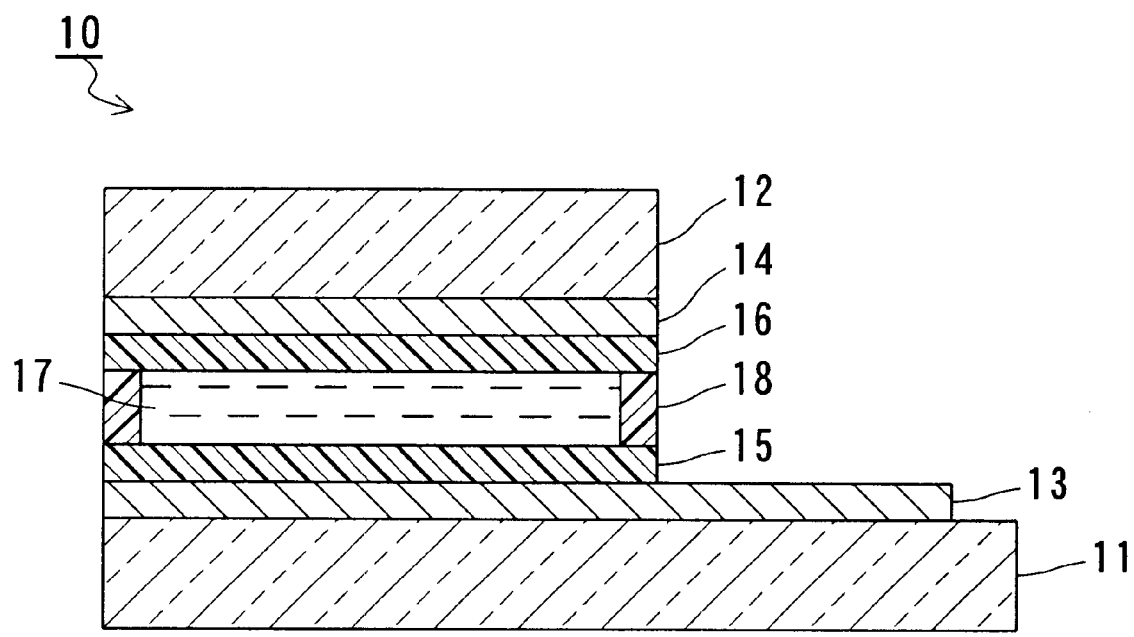
FIG. 2 is a cross-sectional view showing an example of an optical element in accordance with the present invention.

FIG. 1 is a perspective view of an optical element 10 of a first embodiment of the present invention. FIG. 2 is a cross-sectional view of the optical element 10.

As shown in FIGS. 1 and 2, the optical element 10 includes a first substrate 11, a second substrate 12 arranged substantially in parallel to the first substrate 11, a voltage applying electrode 13 arranged between the first substrate 11 and a liquid crystal 17, an opposing electrode 14 arranged substantially in parallel to the voltage applying electrode 13 and opposing the voltage applying electrode 13, a translucent resin film 15 formed so as to cover the voltage applying electrode 13, a translucent resin film 16 formed so as to cover the opposing electrode 14, a liquid crystal 17 arranged between the translucent resin films 15 and 16 (i.e. between the voltage applying electrode 13 and the opposing electrode 14), and a sealing resin 18 arranged between the translucent resin films 15 and 16 enclosing the liquid crystal 17.

The first substrate 11 and the second substrate 12 are made, for example, of glass and are translucent.

The voltage applying electrode 13 serves as an electrode for applying a desired voltage to the liquid crystal 17. The voltage applying electrode 13 is formed on the main face on the inner side (i.e. the side of the liquid crystal 17) of the first substrate 11.

Together with the voltage applying electrode 13, the opposing electrode 14 serves as an electrode for applying a desired voltage to the liquid crystal 17. The opposing electrode 14 is formed on the main face on the inner side (i.e. the side of the liquid crystal 17) of the second substrate 12. The opposing electrode 14 is connected to an electrode 19, which is formed on the first substrate 11, via a conductive resin (not shown in the drawings) formed in a portion of the sealing resin 18. The electrode 19 is connected, for example, to ground (GND). The opposing electrode 14 is translucent, and is made, for example, of ITO. The opposing electrode 14 is formed substantially uniformly at least on a portion that opposes a segment electrode portion 13a on the main surface on the inner side of the second substrate 12.

The translucent resin films 15 and 16 are oriented films for orienting the liquid crystal 17 in a certain direction, and are, for example, polyvinylalcohol films. By rubbing the translucent resin films 15 and 16, the liquid crystal 17 can be oriented into a certain direction. Of course, it is also possible to orient the liquid crystal 17 by another method (for example, by oblique deposition).

The liquid crystal 17 functions as a phase changing layer for changing the phase of incident light. The liquid crystal 17 can be, for example, a nematic liquid crystal. Changing the voltage between the voltage applying electrode 13 and the opposing electrode 14 alters the refractive index of the liquid crystal 17, which changes the phase of incident light. Instead of the liquid crystal 17, it is also possible to use another phase changing layer made of a phase changing material (the same is true for the following embodiments). As the phase changing material, it is possible to use a material whose refractive index or volume (film thickness) changes depending on the voltage between the voltage applying electrode 13 and the opposing electrode 14. An example of a material whose refractive index changes depending on the voltage is a liquid crystal. An example of a material whose volume changes depending on the voltage is PLZT (transparent perovskite crystal containing lead oxide, lanthanum, zirconium oxide, and titanium oxide). If a solid such as PLZT is used for the phase changing layer, either the voltage applying electrode 13 or the opposing electrode 14 should be formed on the phase changing layer. Consequently, in this case, either the first substrate 11 or the second substrate 12 can be left out. Consequently, if PLZT is used, the element can be made thinner.

The sealing resin 18 is for sealing the liquid crystal 17 and is, for example, an epoxy resin.

Figure 3:
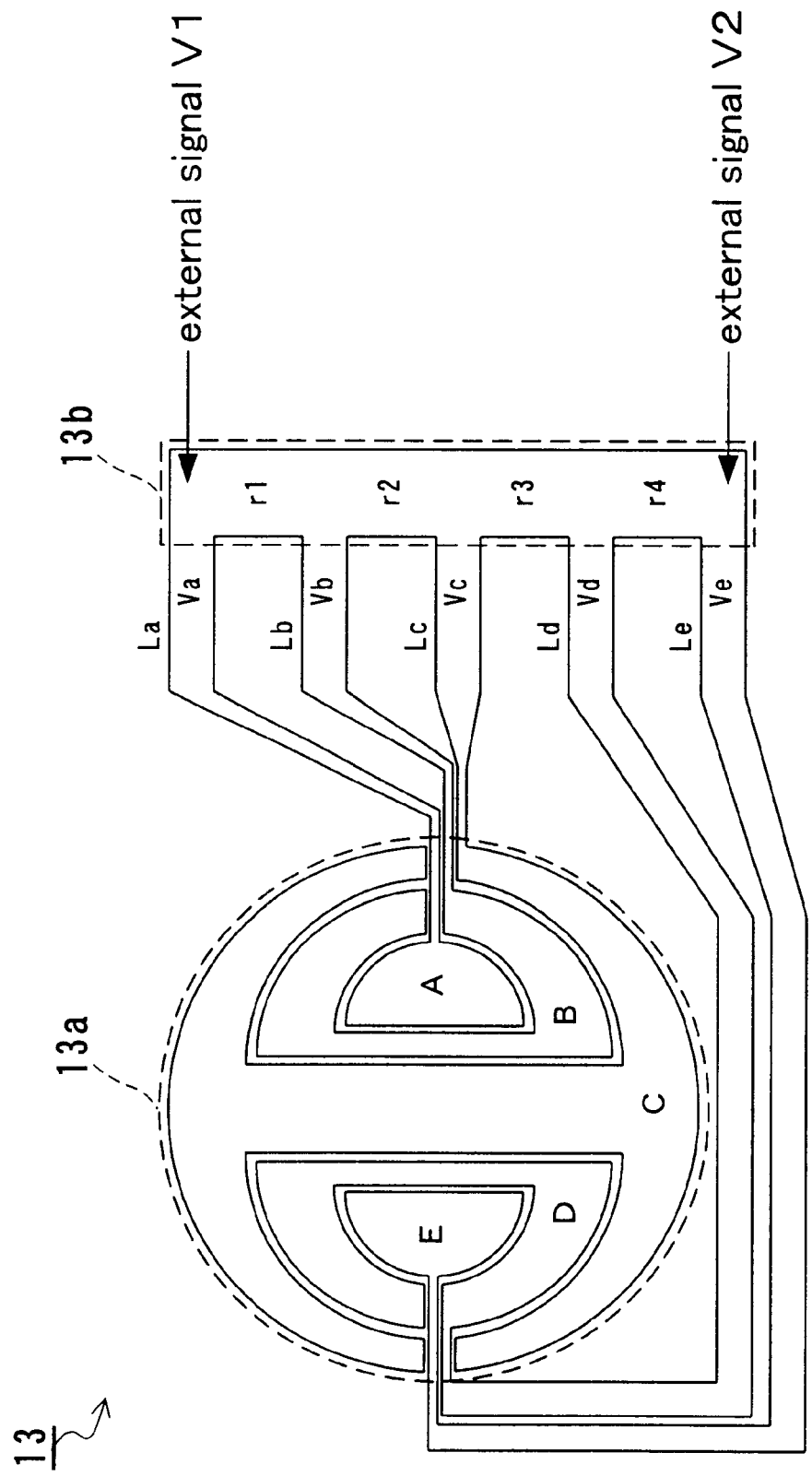
FIG. 3 is a top view showing an example of a voltage applying electrode of an optical element in accordance with the present invention.

FIG. 3 is a top view of the voltage applying electrode 13. Referring to FIG. 3, the voltage applying electrode 13 includes a segment electrode portion 13a and a voltage control electrode 13b.

As shown in FIG. 3, the segment electrode portion 13a includes a plurality of segment electrodes A, B, C, D and E. The segment electrodes A through E and the voltage control electrode 13b are electrically connected by lead lines La through Le. The segment electrodes A and E are substantially semi-circular. The shape of the segment electrode A combined with the segment electrode B is substantially semi-circular, and the same is true for segment electrodes D and E. The shape of all segment electrodes A through E combined is that of a substantially perfect circle. The segment electrodes A and B, and the segment electrodes D and E are arranged substantially symmetrically with respect to the segment electrode C. The shape of the segment electrodes can be changed in accordance with the aberration distribution of light to be corrected, and the shapes shown in FIG. 3 are merely an example.

The segment electrode portion 13a is a translucent electrode, and can be made, for example, of ITO. The voltage control electrode 13b is made of a conductive material. Using the same material for the segment electrode portion 13a and the voltage control electrode 13b facilitates the manufacturing of the voltage applying electrode 13.

Figure 4:
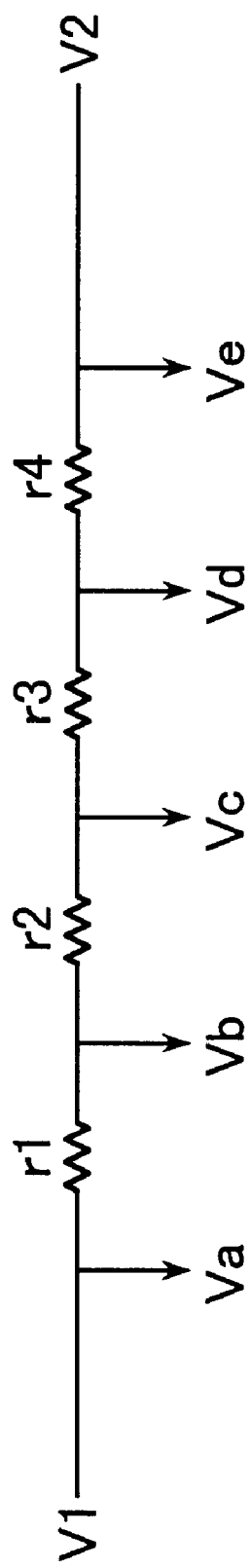
FIG. 4 is a circuit diagram showing the equivalent circuit of a voltage control electrode of an optical element in accordance with the present invention.

The voltage control electrode 13b controls a voltage applied from outside and applies it to the segment electrode portion 13a. Voltages V1 and V2 are applied from the outside to predetermined positions on the voltage control electrode 13b. FIG. 4 is an equivalent circuit of the voltage control electrode 13b. In FIG. 4, r1 is the resistance between the lead lines La and Lb, r2 is the resistance between the lead lines Lb and Lc, r3 is the resistance between the lead lines Lc and Ld, and r4 is the resistance between the lead lines Ld and Le. The voltages V1 and V2 applied to the voltage control electrode 13b are divided by the resistance of the voltage control electrode 13b so that voltages Va, Vb, Vc, Vd, and Ve are outputted to the lead lines La through Le respectively. The outputted voltages Va through Ve can be controlled by choosing the material of the voltage control electrode 13b and its shape accordingly. Since the liquid crystal 17 acts as an extremely small capacitor, the signal for driving the liquid crystal 17 (e.g. a rectangular wave of 1 kHz frequency) hardly flows into the liquid crystal 17. Consequently, the voltages Va through Ve outputted from the voltage control electrode 13b are applied almost unchanged to the segment electrode portion 13a.

Figure 5:
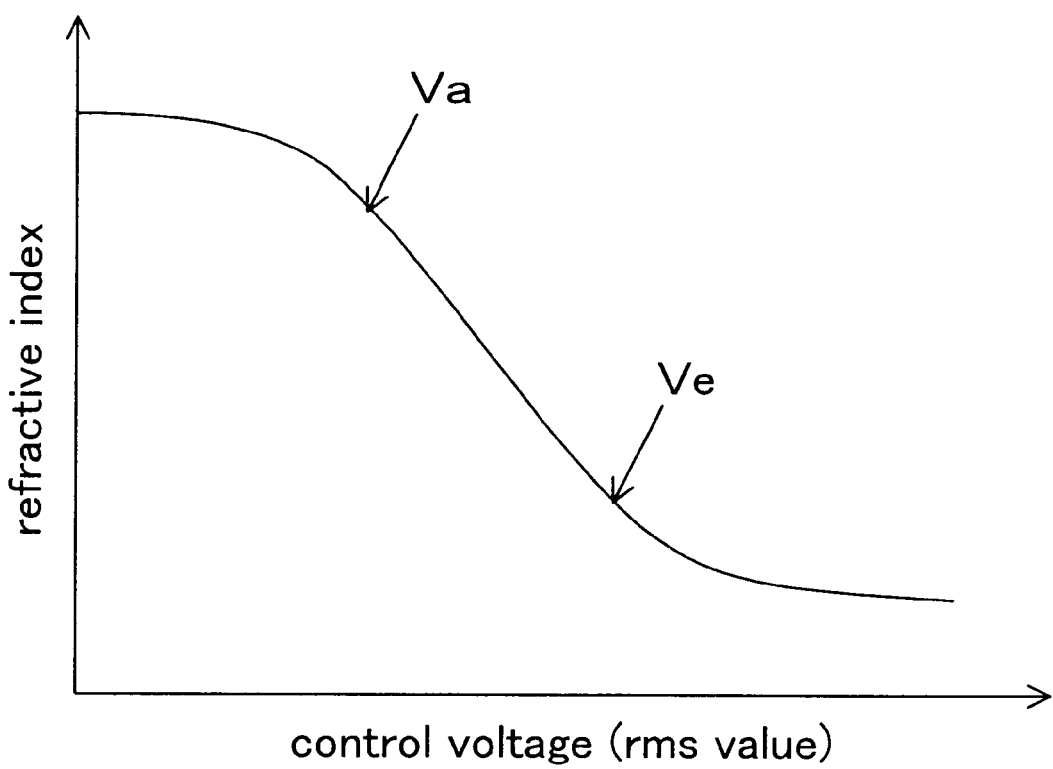
FIG. 5 is a graph showing the refractive index of the liquid crystal of an optical element in accordance with the present invention as a function of the control voltage.

FIG. 5 shows the refractive index of the liquid crystal 17 as a function of the control voltages (Va through Ve) applied to the liquid crystal 17 (the applied voltage is, for example in the case of a rectangular wave of 1 kHz frequency, the rms value). As shown in FIG. 5, the refractive index of the liquid crystal 17 hardly changes until the control voltage reaches a certain value. When the control voltage exceeds a certain threshold value, the refractive index decreases linearly. And when the control voltage exceeds another threshold value, the refractive index hardly changes. Consequently, by controlling the liquid crystal 17 with voltages of the range in which the refractive index changes substantially linearly with respect to the control voltage, the phase change of the light that passes the segment electrode can be changed linearly with respect to the applied voltage.

In the optical element 10, the refractive index of the liquid crystal 17 and thereby the light path length changes in accordance with the voltage between the segment electrode portion 13a to which the voltages Va through Ve are applied and the opposing electrode 14. Consequently, the light passing through the liquid crystal 17 can be subjected to the desired phase change by changing the voltages Va through Ve, and wave-front aberrations caused, for example, by tilting an optical recording medium can be corrected.

For example, to correct the wave-front aberrations occurring when the tilt is 1° (see FIG. 25), the phase change of the light passing through the segment electrodes A through E should be increasing from the segment electrode A to the segment electrode B to the segment electrode C to the segment electrode D to the segment electrode E. Moreover, since the absolute values of the phase changes of the wave-front aberrations in FIG. 25 on the left and right with respect to the center are substantially the same but have different signs, the phase change of the light passing the segment electrodes on the left and right should be substantially anti-symmetrical, taking the phase change of the light passing through the segment electrode C as a reference. In other words, it is preferable that the absolute value of the difference between the phase change of the light passing through the segment electrode A and the phase change of the light passing through the segment electrode C is the same as the absolute value of the difference between the phase change of the light passing through the segment electrode E and the phase change of the light passing through the segment electrode C, and that their signs are opposite.

Analogously, it is preferable that the absolute value of the difference between the phase change of the light passing through the segment electrode B and the phase change of the light passing through the segment electrode C is the same as the absolute value of the difference between the phase change of the light passing through the segment electrode D and the phase change of the light passing through the segment electrode C, and that their signs are opposite.

To change the phase of the light passing through the segment electrodes in the above-described manner, it is preferable that the voltages Va through Ve applied to the segment electrodes A through E satisfy the relations Va=Vc+X, Vb=Vc+Y, Vd=Vc−Y, and Ve=Vc−X (where X and Y are positive and X is larger than Y). In order to establish these relationships, r1 should be equal to r4, and r2 should be equal to r3 in the equivalent circuit shown in FIG. 4.

As an example, let us assume that the voltage applying electrode 13 is made of ITO, and that r1, r2, r3, and r4 are 1 kΩ each. For example, if an ITO film having a resistance of about 30 Ω/mm$^2$ is used, the distance between adjacent lead lines should be 100 μm and the width of the voltage control electrode 13b should be 3.3 μm. Under these conditions, the voltages Va through Ve applied to the segment electrodes A through E can be changed by changing V1 and V2, while satisfying the above relations.

It is preferable that the thickness $d_a$ of the segment electrode portion 13a is $d_a=(2N_a+1)\lambda/2n_a$ (wherein λ is the wavelength of the incident light, $N_a$ is an integer of 0 or greater, and $n_a$ is the refractive index of the voltage applying electrode). The segment electrode portion 13a is sandwiched by the first substrate 11 (refractive index ca. 1.5) and the translucent resin film 15 (refractive index ca. 1.5). Consequently, if, for example, ITO with a refractive index of 2 is used for the segment electrode portion 13a, and if the segment electrode portion 13a satisfies the above equation, the segment electrode portion 13a has no influence on the incident light, and reflections at the segment electrode portion 13a can be prevented. If the refractive indices of the layer above and below the voltage applying electrode 13 differ, it is preferable that the denominator in the above equation is $4n_a$.

For the same reason as for the thickness of the segment electrode portion 13a, it is preferable that the thickness $d_b$ of the opposing electrode 14 is $d_b=(2N_b+1)\lambda/2n_b$ (wherein λ is the wavelength of the incident light, $N_b$ is an integer of 0 or greater, and $n_b$ is the refractive index of the opposing electrode). If the refractive indices of the layer above and below the opposing electrode 14 differ, it is preferable that the denominator in the above equation is $4n_b$.

The following is an example of a method for manufacturing the optical element 10, with reference to FIGS. 1 and 2.

To manufacture the optical element 10, first, the voltage applying electrode 13 and the electrode 19 are formed on the first substrate 11. The voltage applying electrode 13 and the electrode 19 can be formed by sputtering a translucent conductive film of, for example, ITO, and patterning the same with a photo-lithography step and an etching step. Then, the translucent resin film 15 is formed, for example by spin-coating, so as to cover the voltage applying electrode 13 and the electrode 19. On the other hand, in parallel with this process, the opposing electrode 14 and the translucent resin film 16 are formed on the second substrate 12. The opposing electrode 14 and the translucent resin film 16 can be formed by the same method as the voltage applying electrode 13 and the translucent resin film 15. Then, the first substrate 11 and the second substrate 12 are opposed, clamping the sealing resin 18, and the liquid crystal 17 is filled between the translucent resin films 15 and 16. Thus, the optical element 10 can be formed.

As mentioned above, in the optical element 10 of the first embodiment, the voltages V1 and V2 applied to the voltage control electrode 13b are divided by the resistances of the voltage control electrode 13b into the voltages Va through Ve, and applied to the segment electrodes A through E of the segment electrode portion 13a. Therefore, a good correcting effect can be attained with regard to light incident on the optical element 10, and the number of signal lines connected to the optical element 10 can be low. Consequently, with this configuration, an optical element can be attained, which displays a good correcting effect with regard to incident light, and which is easy to manufacture.

Figure 6A:
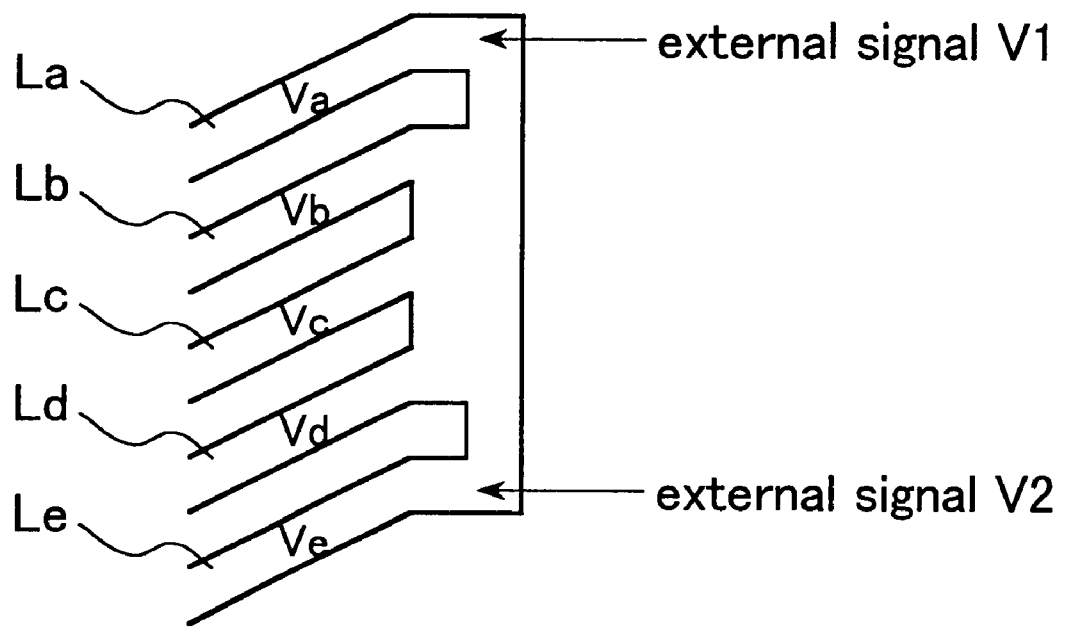
FIGS. 6A and 6B are top views showing another example of a voltage control electrode in an optical element in accordance with the present invention.
Figure 6B:
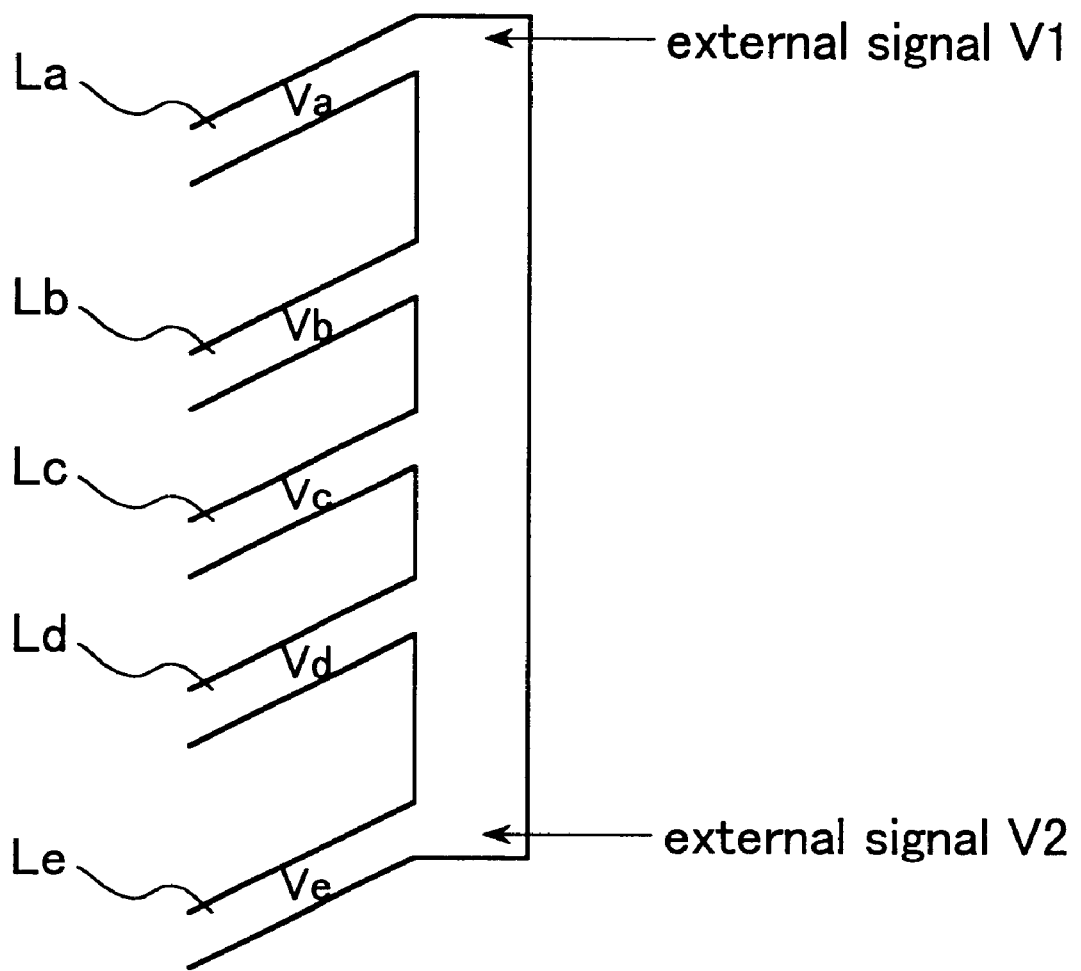
Figure 7:
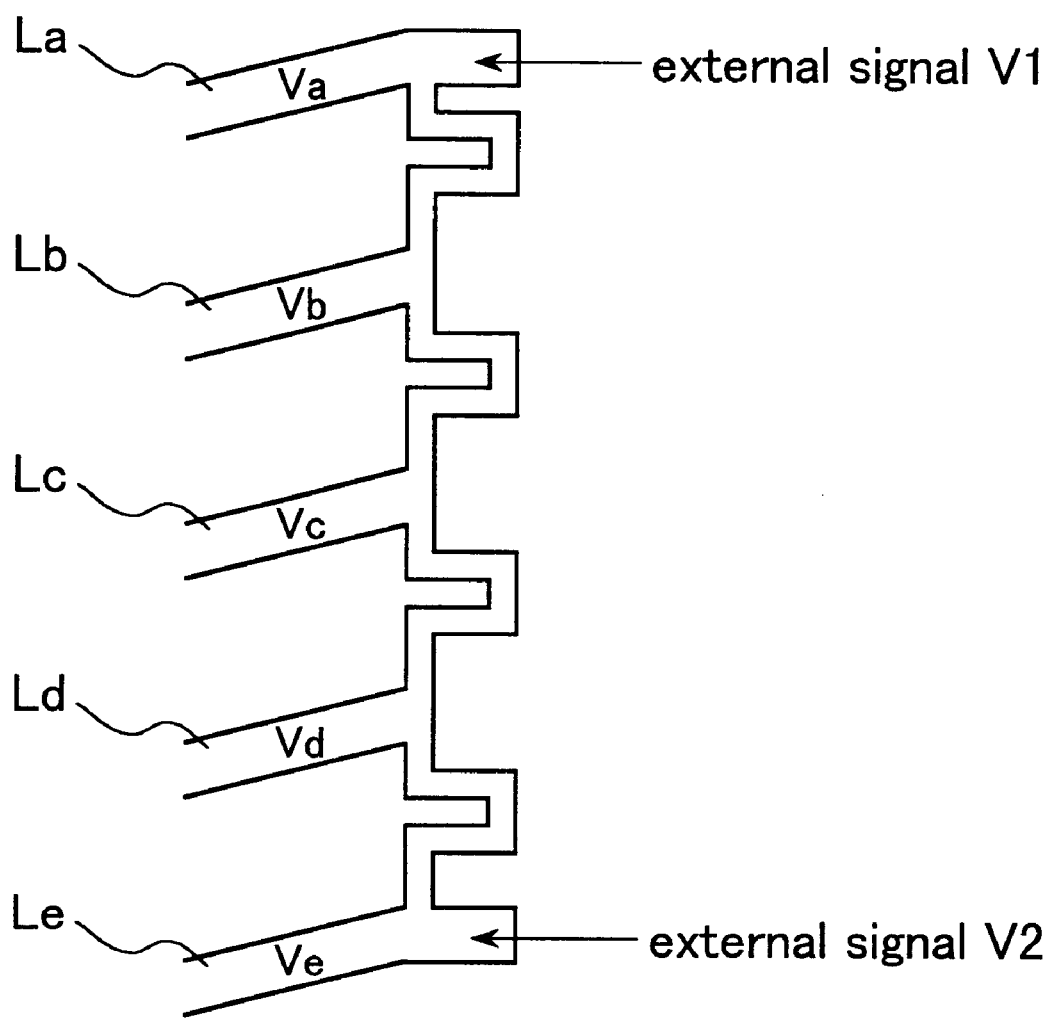
FIG. 7 is a top view showing yet another example of a voltage control electrode in an optical element in accordance with the present invention.

In the first embodiment, a voltage control electrode 13b with a shape as shown in FIG. 3 has been given as an example of the voltage control electrode 13b, but there is no limitation for the voltage control electrode 13b to the shape shown in FIG. 3. For example, depending on the desired resistances r1 through r4, the voltage control electrode 13b also can have a shape as shown in FIGS. 6 and 7. In the voltage control electrode shown in FIG. 6A, the width between the lead lines La and Lb and between the lead lines Ld and Le is smaller than the width between the lead lines Lb and Ld. In the voltage control electrode shown in FIG. 6B, the distance of the lead lines La and Lb and the distance of the lead lines Ld and Le is longer than the distance between the lead lines Lb and Lc and the distance between the lead lines Lc and Ld. The voltage control electrode shown in FIG. 7 has a bent shape. With the shapes of the voltage control electrode 13b shown in FIGS. 6A and 6B, r1 and r4 can be made larger than r2 and r3. Moreover, by letting the voltage control electrode 13b have the shape shown in FIG. 7, the values for r1 to r4 can be adjusted as desired.

Moreover, in the optical element 10 of the first embodiment, the segment electrode portion 13a and the voltage control electrode 13b of the voltage applying electrode 13 have been explained as being made of the same material, but according to the circumstances, it is also possible to make the segment electrode portion 13a and the voltage control electrode 13b of different materials. Moreover, it is also possible to make the voltage control electrode 13b of a plurality of conductive materials.

Figure 8:
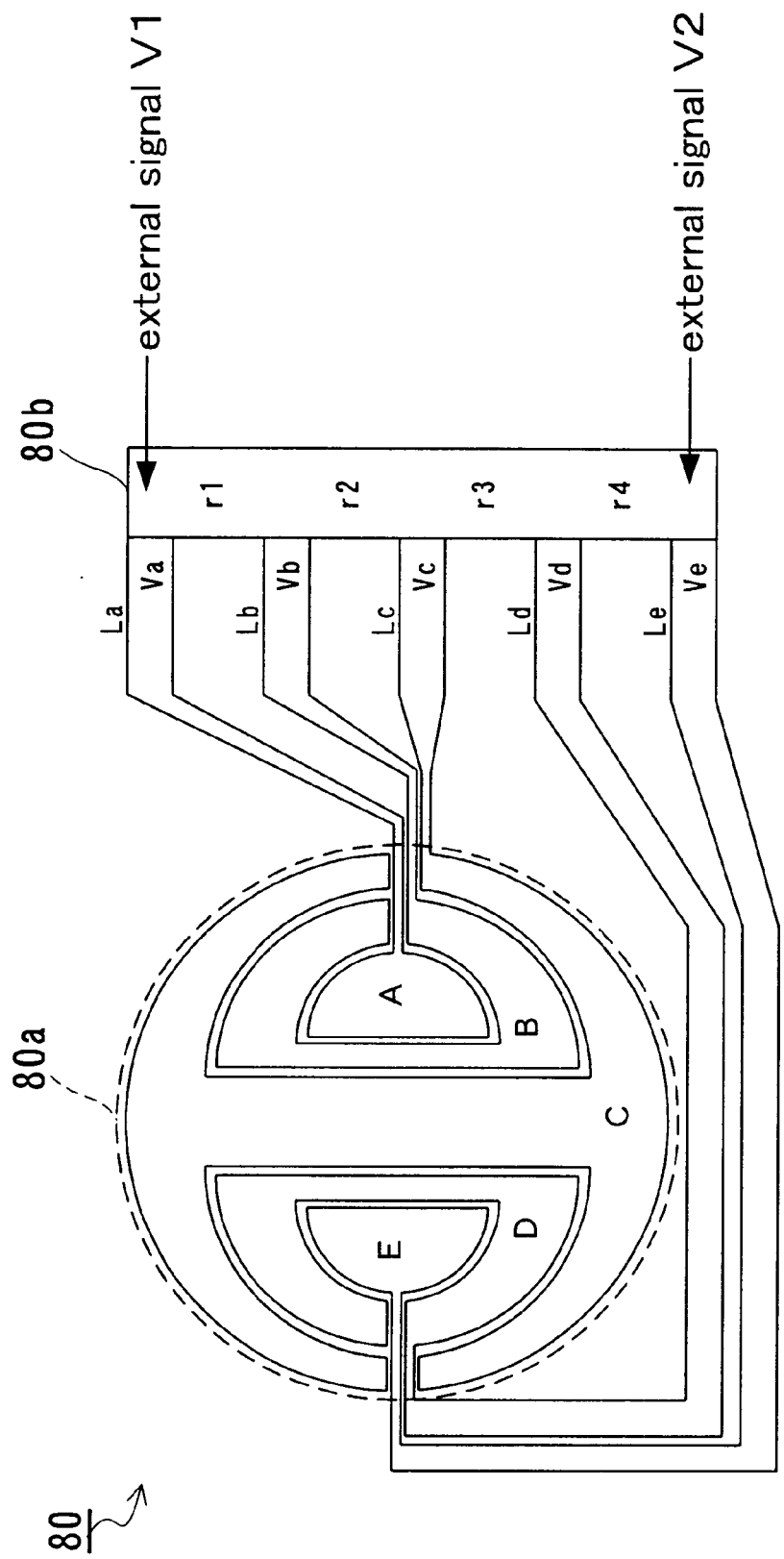
FIG. 8 is a top view showing another example of a voltage applying electrode in an optical element in accordance with the present invention.

FIG. 8 illustrates an example where the material for the voltage control electrode differs from the material for the segment electrode portion. In FIG. 8, the voltage applying electrode 80 (which corresponds to the voltage applying electrode 13 in FIG. 3) includes a segment electrode portion 80a and a voltage control electrode 80b.

The segment electrode portion 80a is a translucent electrode, and is made, for example, of ITO.

The voltage control electrode 80b is made of a material that is different from the segment electrode portion 80a, and can be made of, for example, Ge, Ti, or W, in accordance with the circumstances. If a material with high resistance is used for the voltage control electrode 80b, the current flowing through the voltage control electrode 80b can be reduced, so that the load on the IC for driving the liquid crystal can be reduced, which improves the reliability of the optical element. Also, if a material with high resistance is used for the voltage control electrode 80b, the desired resistance can be attained without choosing a small width for the width of the voltage control electrode 80b, which facilitates the manufacture of the optical element.

Figure 9:
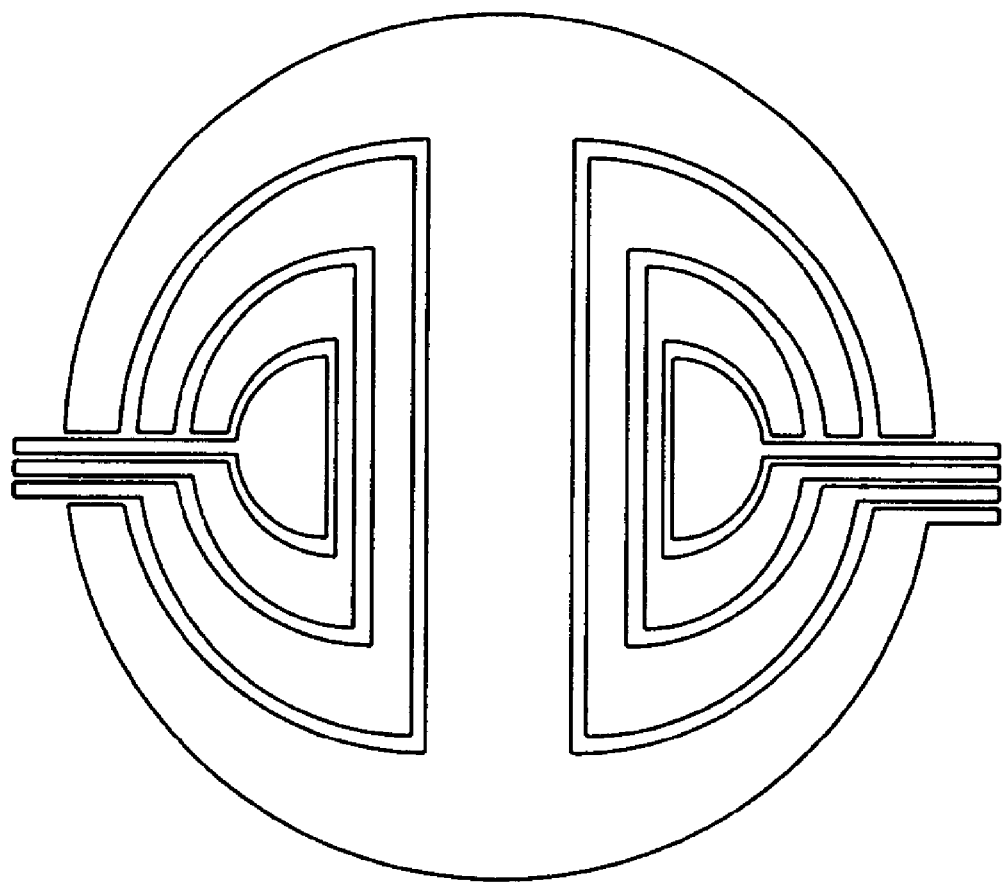
FIG. 9 is a top view showing an example of segment electrodes in an optical element in accordance with the present invention.
Figure 25:
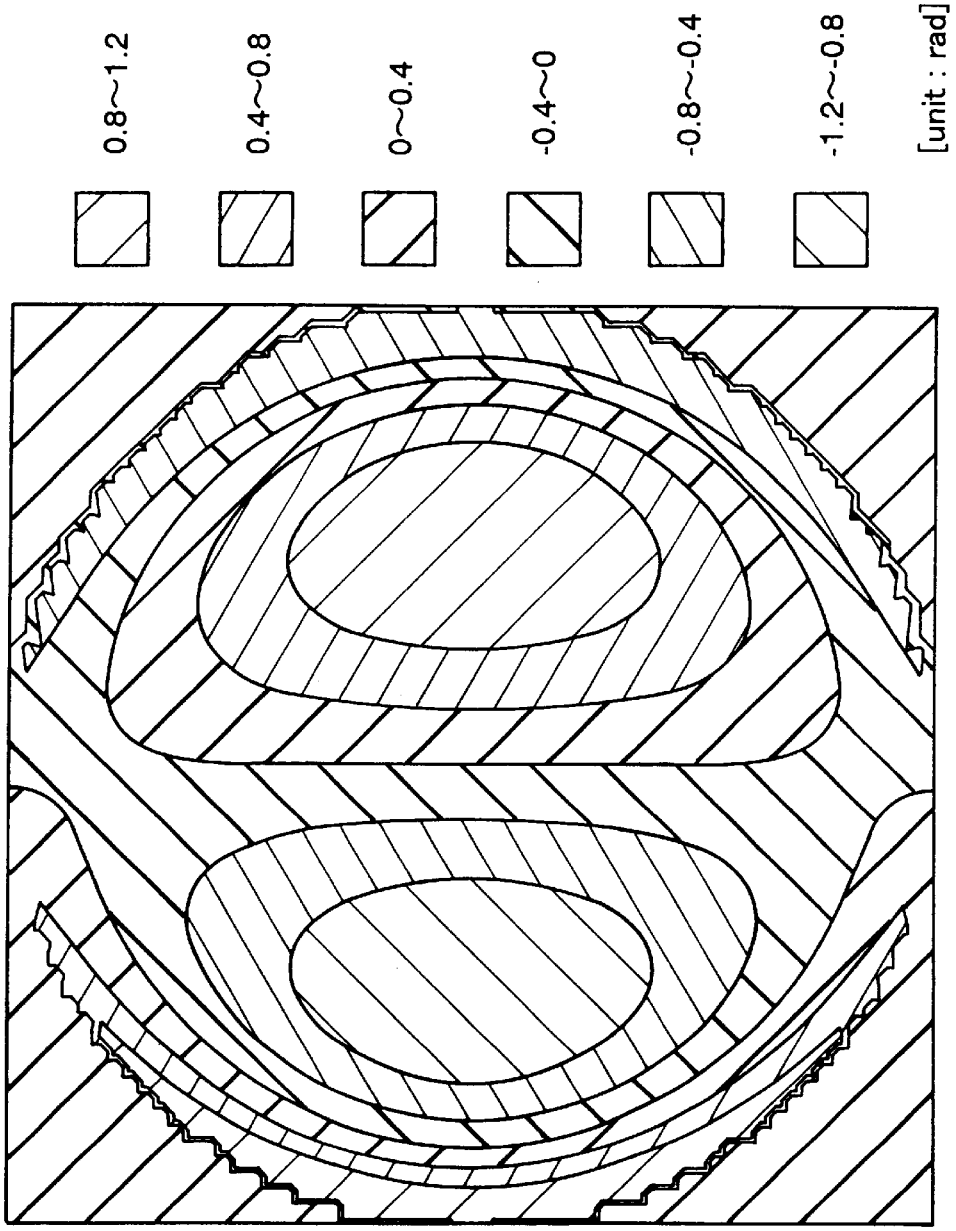
FIG. 25 is a graph showing an example of the wave-front aberrations when the tilt angle is 1°.
Figure 26:
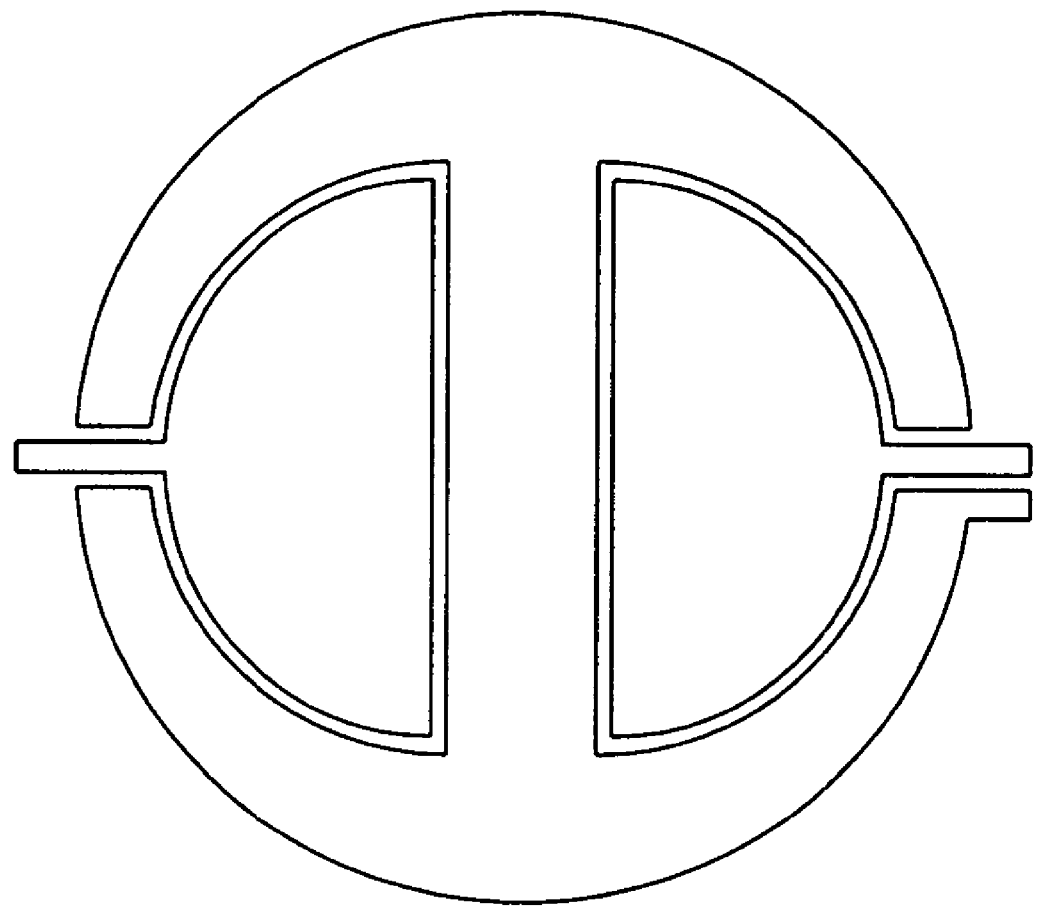
FIG. 26 is a schematic drawing showing an example of a voltage applying electrode in a conventional optical element.

Moreover, in the first embodiment, a segment electrode portion 13a that is divided into the segment electrodes A through E has been given as an example, but by dividing the segment electrode portion 13a even finer, aberrations can be corrected even more precisely (the same is true for all following embodiments as well). For example, using a segment electrode portion 13a having a three-stage pattern (made of seven segment electrodes) as shown in FIG. 9, aberrations can be corrected even more precisely. For example, to correct the wave-front aberrations occurring when an optical recording medium is tilted 1° (see FIG. 25), the wave-front aberrations at the best image point without correction is 80 m$\lambda$ and can be corrected to wave-front aberrations of 60 m$\lambda$ with the segment electrode portion 13a having a one-stage pattern (made of three segment electrodes as shown in FIG. 26). Moreover, the wave-front aberrations can be corrected to 50 m$\lambda$ with the segment electrode portion 13a having a two-stage pattern (made of five segment electrodes as shown in FIG. 3) and to 40 m$\lambda$ with the segment electrode portion 13a having a three-stage pattern (made of seven segment electrodes as shown in FIG. 9). Even when the number of sections is increased into which the segment electrode portion 13a of the optical element 10 is divided, the external voltages fed to the optical element 10 can be kept at V1, V2 and ground, and do not have to be increased.

Figure 10:
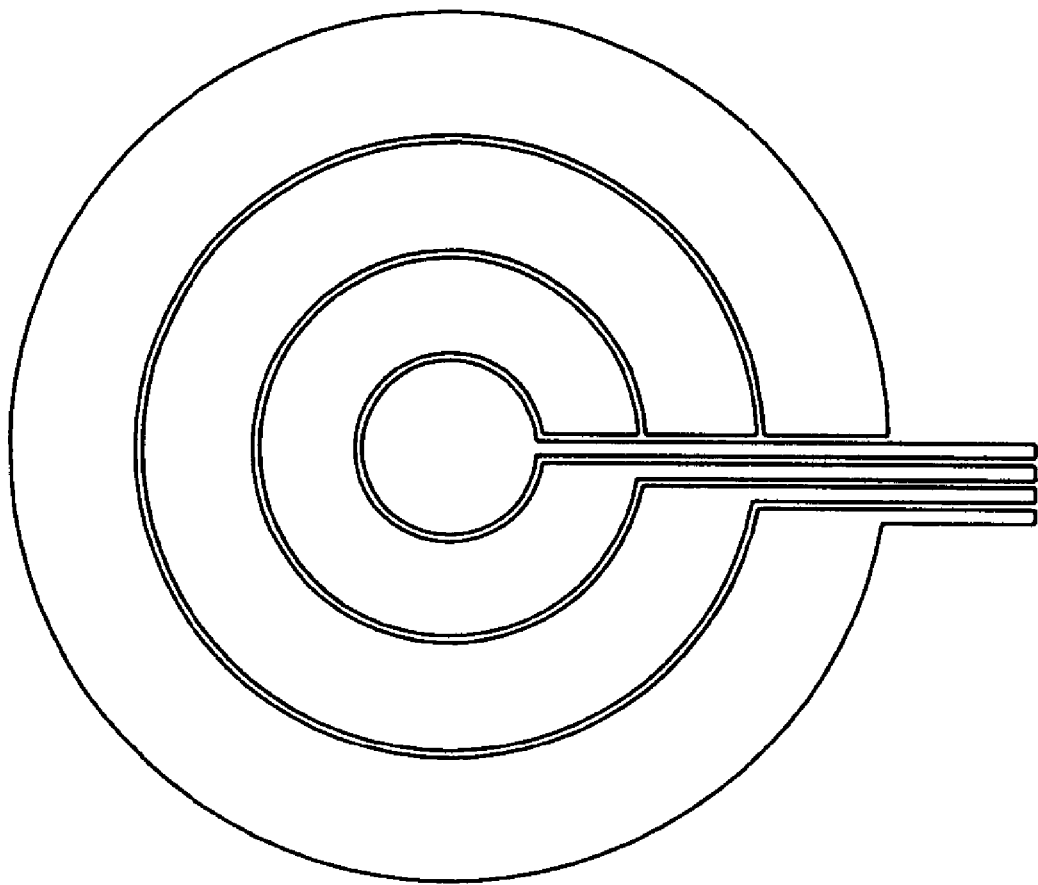
FIG. 10 is a top view showing another example of segment electrodes of an optical element in accordance with the present invention.

The first embodiment has been explained with an optical element for correcting wave-front aberrations due to tilting of an optical recording medium. However, by changing the shape of the voltage applying electrode, it is also possible to correct spherical aberrations. To correct spherical aberrations, the segment electrode should be divided into concentric rings, as shown in FIG. 10 (the same is true for all following embodiments).

Second Embodiment

The second embodiment illustrates another example of an optical element in accordance with the present invention.

Figure 11:
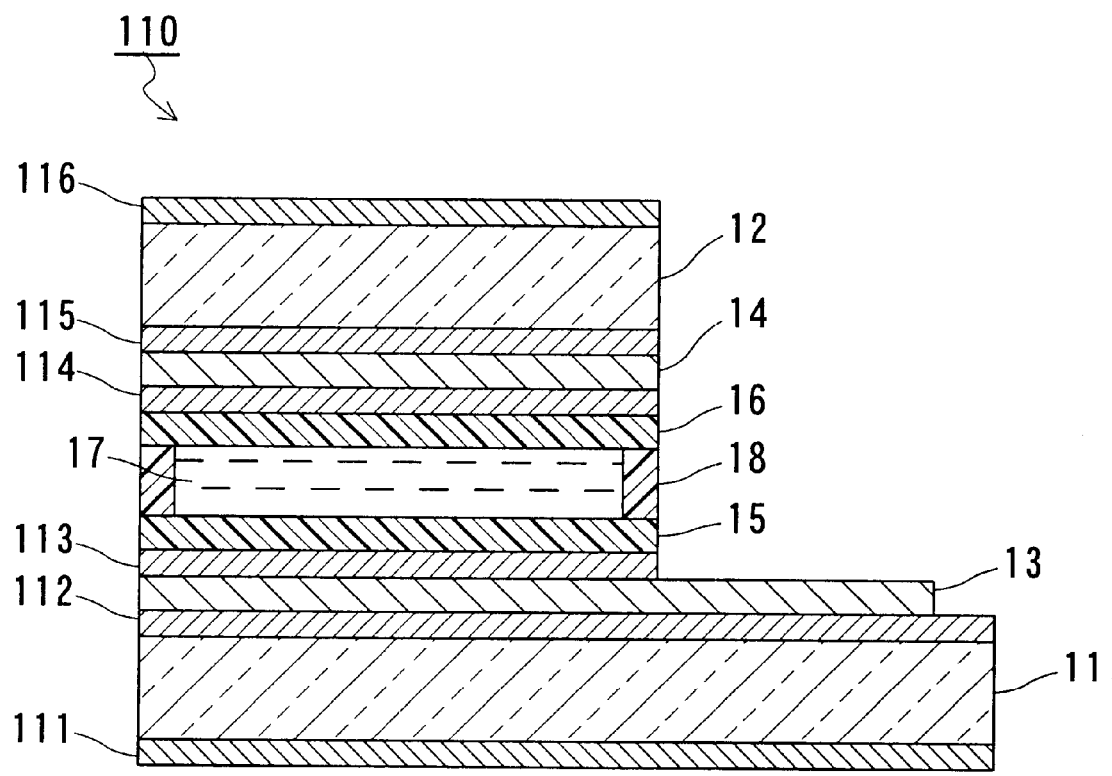
FIG. 11 is a cross-sectional view showing another example of an optical element in accordance with the present invention.

FIG. 11 is a cross-sectional view of an optical element 110 of the second embodiment of the present invention.

Referring to FIG. 11, the optical element 110 includes, like the optical element 10 of the first embodiment, a first substrate 11, a second substrate 12, a voltage applying electrode 13, an opposing electrode 14, translucent resin films 15 and 16, a liquid crystal 17, and a sealing resin 18. The optical element 110 further includes an anti-reflective film 111 formed on the main surface on the outer side (away from the liquid crystal 17) of the first substrate 11, an interlayer anti-reflective film 112 arranged between the first substrate 11 and the voltage applying electrode 13, an interlayer anti-reflective film 113 arranged between the voltage applying electrode 13 and the translucent resin film 15, an interlayer anti-reflective film 114 arranged between the opposing electrode 14 and the translucent resin film 16, an interlayer anti-reflective film 115 arranged between the second substrate 12 and the translucent resin film 16, and an anti-reflective film 116 formed on the main surface on the outer side of the second substrate 12 (away from the liquid crystal 18).

The first substrate 11, the second substrate 12, the voltage applying electrode 13, the opposing electrode 14, the translucent resin films 15 and 16, the liquid crystal 17, the sealing resin 18, and the electrode 19 are the same as in the first embodiment, so that their explanation has been omitted.

The anti-reflective films 111 and 116, and the interlayer anti-reflective films 112 to 115 are formed so as to avoid reflection of light passing through the optical element 110. The anti-reflective films 111 and 116, and the interlayer anti-reflective films 112 to 115 can be formed, for example, by sputtering or by vapor deposition.

Figure 12:
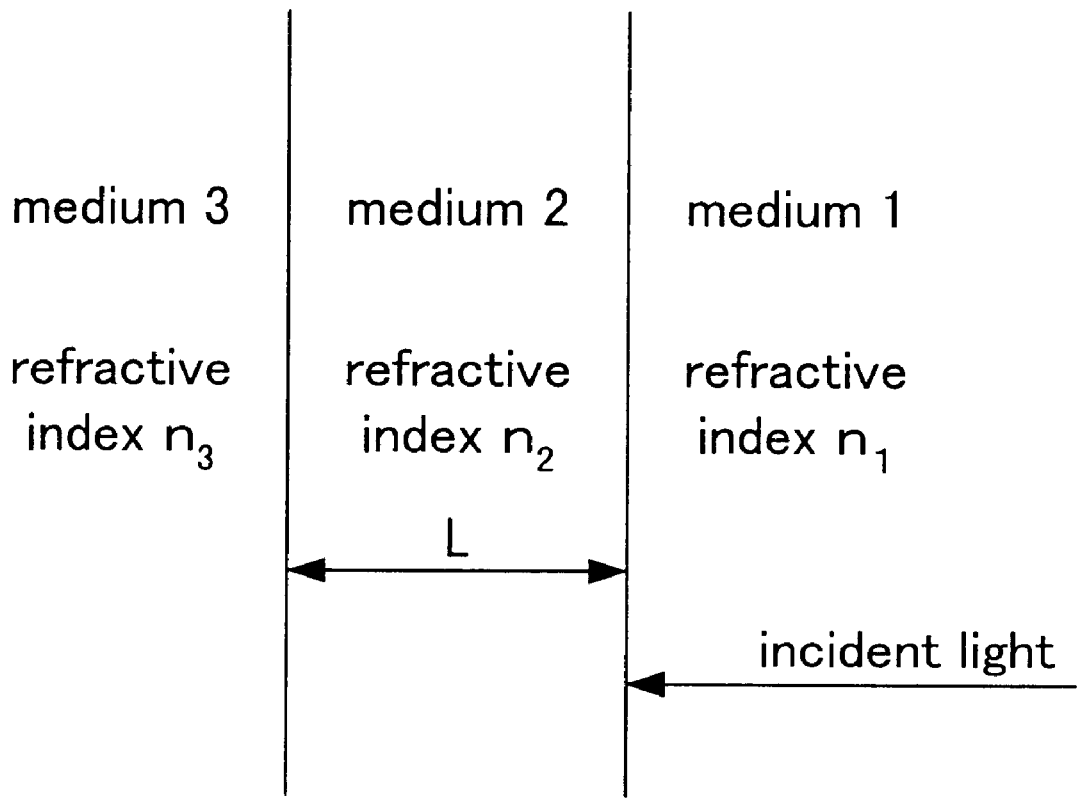
FIG. 12 is a schematic drawing illustrating the function of the anti-reflective layers in an optical element in accordance with the present invention.

Referring to FIG. 12, the following is a general explanation of the anti-reflective films. When light passes through the media 1 to 3 with the refractive indices $n_1$ to $n_3$ as shown in FIG. 12, and the film thickness of the medium 2 is L, then the reflectivity at the medium boundary can be minimized if $L=(2N_2+1)\lambda/4n_2$ is satisfied (wherein $\lambda$ is the wavelength of the incident light, $N_2$ is an integer of 0 or greater, and $n_2$ is the refractive index of the medium 2). Furthermore, if the refractive index $n_2$ of the medium 2 approaches the geometric means of the refractive index $n_1$ of the medium 1 and the refractive index $n_3$ of the medium 3 (i.e. the square root of the product of $n_1$ and $n_3$), the reflectivity at the medium 2 can be reduced even further.

Consequently, it is preferable to use films for the anti-reflective films 111, 116, as well as the interlayer anti-reflective films 112 to 115, whose thicknesses and refractive indices satisfy this relation.

For example, if the refractive index of air is 1 and the refractive index of the first substrate 11 and the second substrate 12 is 1.5 (e.g. when regular glass is used for the first substrate 11 and the second substrate 12), it is preferable that the refractive indices of the anti-reflective films 111 and 116 are close to 1.22. Consequently, magnesium fluoride (refractive index: 1.38) whose refractive index is close to 1.22 can be used for the anti-reflective films 111 and 116, for example.

If the refractive index of the first substrate 11 and the second substrate 12 is 1.5 and the refractive index of the voltage applying electrode 13 and the opposing electrode 14 is 2 (e.g. when ITO is used for the voltage applying electrode 13 and the opposing electrode 14), it is preferable that the refractive indices of the interlayer anti-reflective films 112 and 115 are close to 1.73. Consequently, alumina (refractive index: 1.68) whose refractive index is close to 1.73 can be used for the interlayer anti-reflective films 112 and 115, for example.

Similarly, if the refractive index of the voltage applying electrode 13 and the opposing electrode 14 is 2 and the refractive index of the translucent resin films 15 and 16 is 1.5 (for example, if polyvinylalcohol films are used for the translucent resin films 15 and 16), it is preferable that the refractive indices of the interlayer anti-reflective films 113 and 114 are close to 1.73. Consequently, alumina, whose refractive index is close to 1.73, can be used for the interlayer anti-reflective films 113 and 114. Since the refractive index of the translucent resin films 15 and 16 is almost the same as the refractive index of the liquid crystal 17, it is not necessary to be concerned with reflections between the translucent resin films 15 and 16 and the liquid crystal 17.

The indices and materials cited for the above-mentioned anti-reflective films are mere examples, and it does not have to be stressed that depending on the materials used for the optical element 110 and the wavelengths of the passing light, the optimal refractive indices and film thicknesses of the anti-reflective films may vary.

Moreover, the anti-reflective films 111, 116, and the interlayer anti-reflective films 112 to 115 do not necessarily have to be single layers, and also can be layered of a plurality of thin films with different refractive indices. Using anti-reflective films including a plurality of thin films, it is possible to reduce the reflectivity even further.

The optical element 110 of the second embodiment attains the same effect as the optical element 10 of the first embodiment. In addition, since the optical element 110 is provided with the anti-reflective films 111, 116, and the interlayer anti-reflective films 112 to 115, the attenuation of incident light due to reflections at the surface of the optical element 110 and due to internal reflections can be prevented.

Third Embodiment

The third embodiment illustrates another example of an optical element in accordance with the present invention.

Figure 13:
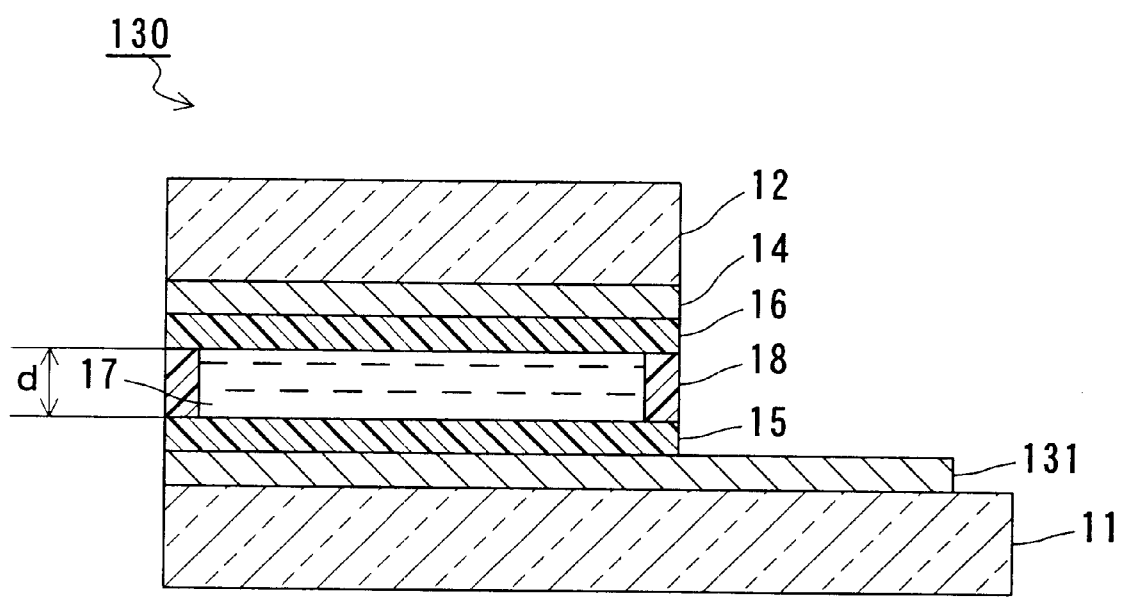
FIG. 13 is a cross-sectional view showing yet another example of an optical element in accordance with the present invention.

FIG. 13 is a cross-sectional view of an optical element 130 of the third embodiment of the present invention.

Referring to FIG. 13, the optical element 130 includes a first substrate 11, a second substrate 12 arranged substantially in parallel to the first substrate 11, a voltage applying electrode 131 arranged between the first substrate 11 and a liquid crystal 17, an opposing electrode 14 arranged substantially in parallel to the voltage applying electrode 131 and opposing the voltage applying electrode 131, a translucent resin film 15 formed so as to cover the voltage applying electrode 131, a translucent resin film 16 formed so as to cover the opposing electrode 14, a liquid crystal 17 arranged between the translucent resin films 15 and 16 (i.e. between the voltage applying electrode 131 and the opposing electrode 14), and a sealing resin 18 arranged between the translucent resin films 15 and 16 enclosing the liquid crystal 17.

Except for the voltage applying electrode 131, all parts are the same as in the first embodiment, so that their explanation has been omitted.

Figure 14:
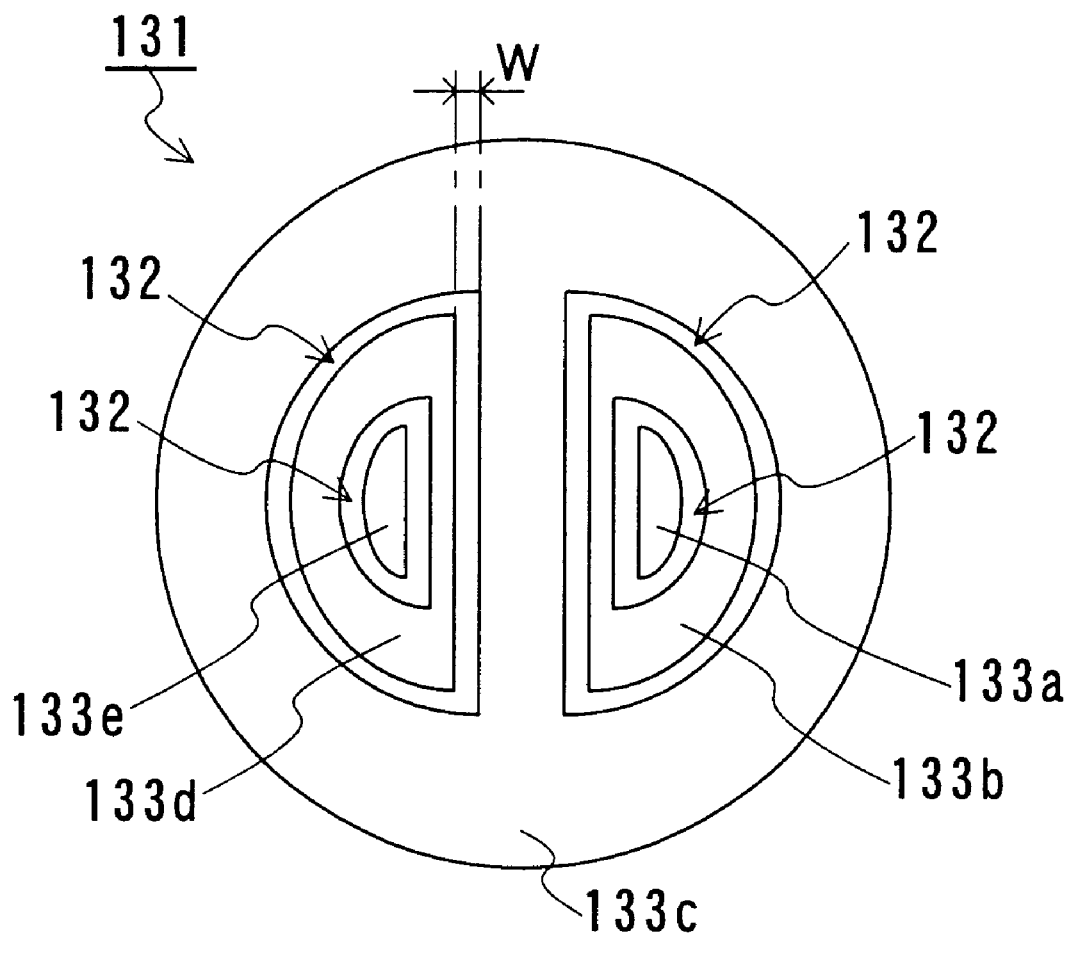
FIG. 14 is a top view showing an example of a voltage applying electrode in an optical element in accordance with the present invention.

FIG. 14 is a partial top view of the voltage applying electrode 131. FIG. 14 also illustrates the orientation of the liquid crystal, the polarization direction of the incident light and the radial direction of the recording medium. Moreover, the lead electrodes have been omitted from FIG. 14, but it is possible to use the same kind of lead electrodes as shown in FIG. 3.

The voltage applying electrode 131 applies a desired voltage to the liquid crystal 17, whereby it controls the phase of light passing through the liquid crystal 17. Separation portions 132 divide the voltage applying electrode 131 into a plurality of segment electrodes 133a to 133e. The segment electrodes 133a to 133e are translucent electrodes and can be made, for example, of ITO. The shape of the segment electrodes should be in accordance with the distribution of the aberration to be corrected, and the shape shown in FIG. 14 is only an example.

The width W of the separation portions 132 is a width selected so that substantially the entire region of the liquid crystal (phase changing layer) 17 located above the separation portions 132 is subjected the influence of the segment electrodes. This means, the width of the separation portions 132 is not more than the width where a region of liquid crystal 17 influenced by a certain segment electrode is in contact to a region of liquid crystal 17 influenced by another segment adjacent to the certain segment electrode. To be specific, if the thickness of the liquid crystal 17 in a direction perpendicular to the first substrate 11 is d (see FIG. 13), it is preferable that the width W and the thickness d fulfill the relation W≦3d, more preferably W≦2d. The width W can be, for example, in the range of 1 through 15 μm.

Figure 15:
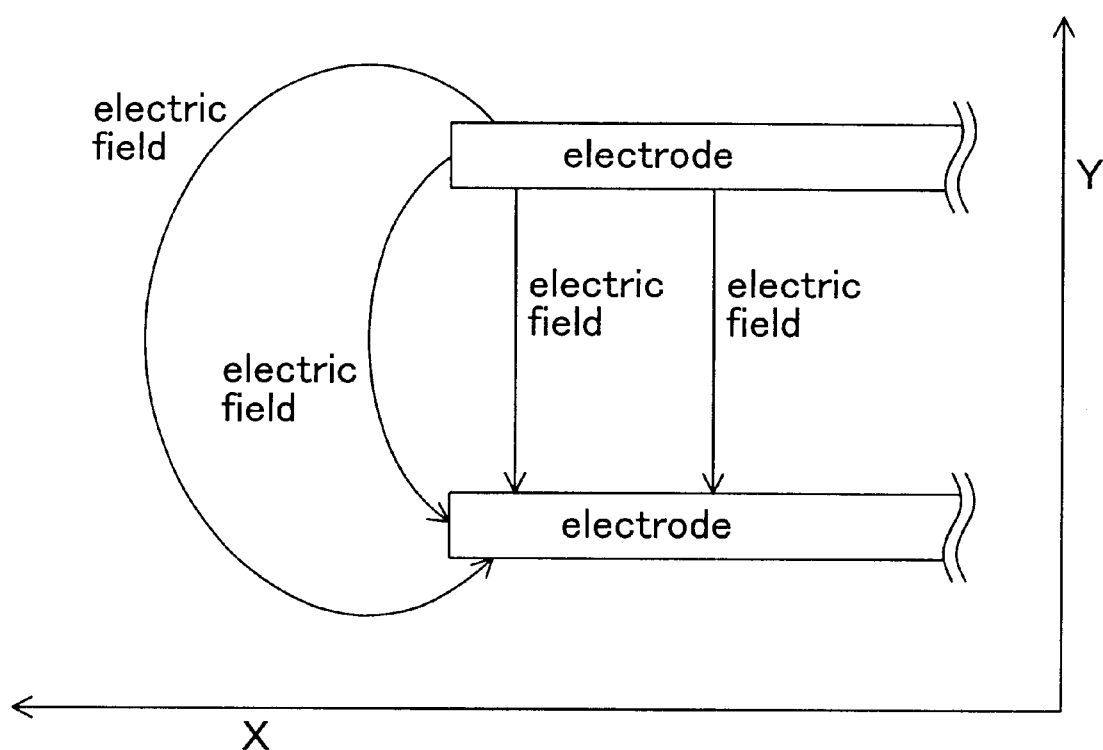
FIG. 15 is a diagram illustrating the function of an optical element in accordance with the present invention.
Figure 16:
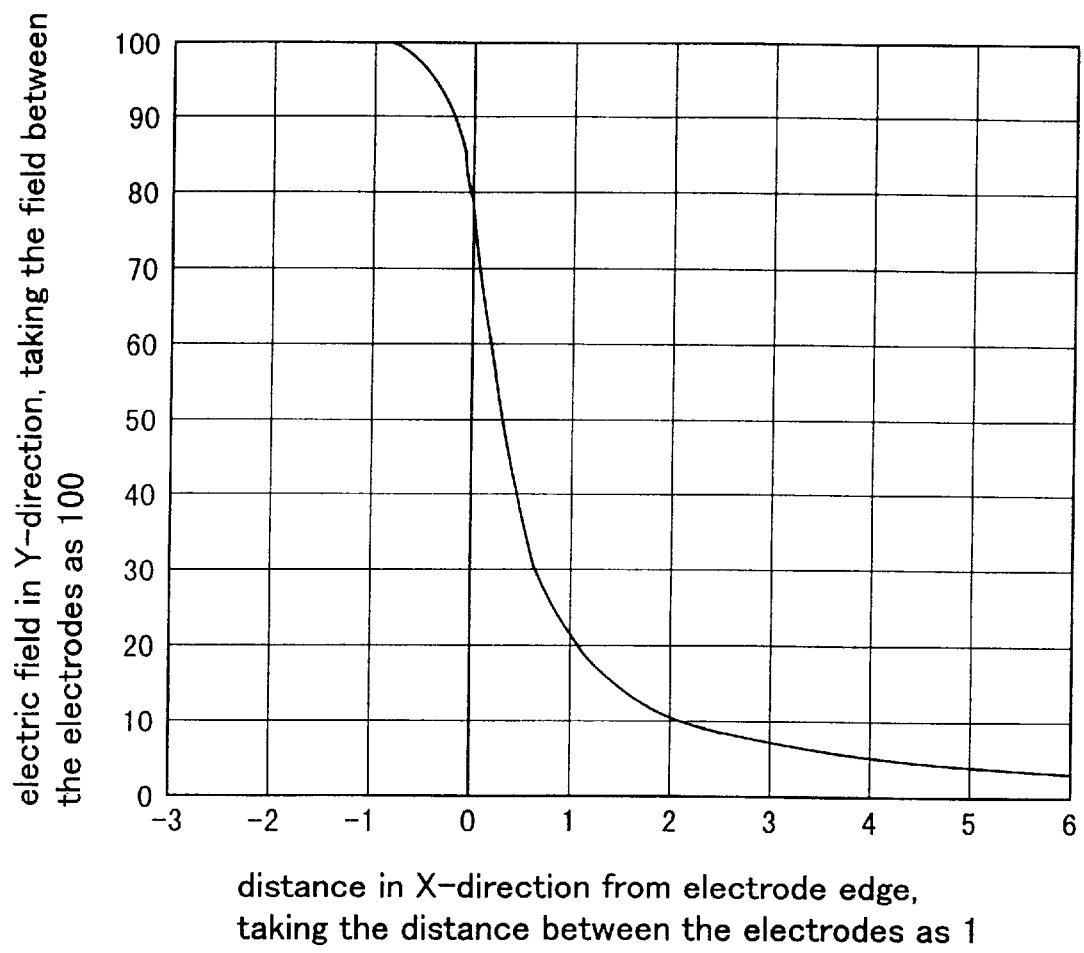
FIG. 16 is a graph illustrating the function of an optical element in accordance with the present invention.

The following is a more detailed explanation of the behavior of the liquid crystal 17 on the separation portions 132. Usually, the electric field at the edges of two opposing electrodes extends into the space surrounding the electrodes. This situation is shown schematically in FIG. 15. In the case of a parallel plate capacitor with two semi-infinite opposing electrodes, the relation between the distance from the edge of an electrode (i.e. the distance in the X-axis direction in FIG. 15) and the potential thereof (insulation effect of the parallel plate capacitor) can be illustrated by conformal mapping (see Miharu FUJIMOTO "Denjikigaku", published by Asakura Shoten, or Kenichi GOTO, Shuichi YAMAZAKI "Denjikigakuenshu", published by Kyoritsu Shuppan). Since the strength of the electric field is a differential coefficient of the potential, the relation between the distance from the edge of the electrodes and the field in the direction perpendicular to the electrodes can be determined by differentiating the potential in the direction vertical to the electrodes (Y-axis direction in FIG. 15). The result of this calculation is shown in FIG. 16. In FIG. 16, the abscissa marks the distance in X-axis direction from the electrode edge as the normalized value taking the distance between the two opposing electrodes as 1. Moreover, zero on the abscissa marks the edge of the electrodes, and an increasing value for x expresses an increasingly distant position from the electrodes. The Y-axis, on the other hand, marks the electric field strength in the Y-axis direction, taking the electric field strength between the electrodes as 100.

FIG. 16 shows that an electric field leaks into the portion where there are no electrodes, and that the electric field at a distance equal to the distance of the two electrodes (x=1) is about 20% of the electric field between the electrodes y=100). Consequently, the field also changes the refractive index of the liquid crystal at a position above the separation portion 132 in the actual optical element. Since there are segment electrodes adjacent to both sides of the separation portions 132, the liquid crystal below the separation portions 132 is influenced by the electric field leaking from the segment electrodes on both sides. FIG. 16 shows the calculation result for the case both electrodes are semi-infinite, but in the actual optical element, the segment electrodes can be thought of as semi-infinite and the opposing electrodes as infinite. In this case, the electric force lines do not curve back to the back side of the infinite electrode (opposing electrode), so that the electric field strength at a given distance from the semi-infinite electrode is larger than that shown in FIG. 16. Consequently, it can be assumed that the electric field at a distance equal to the distance between the electrodes (x=1) leaks considerably from the electrode edge.

For testing, an actual optical element having a voltage control electrode 131 as shown in FIG. 14 was made with a liquid crystal thickness d of 5 μm, and a width W of the separation portions 132 of 10 μm (2d). Then, the aberrations were corrected in an optical head (see FIG. 18) using this optical element. When the optical recording medium was tilted 1°, the jitter was at least 20% when the aberrations were not corrected, but only 7.5% when the aberrations were corrected using this optical element. As the jitter was 6.6% when the optical recording medium was not tilted, it can be said that the coma aberration due to tilting the optical recording medium was almost completely corrected. Consequently, it can be said that the liquid crystal above the separation portions 132 had an almost optimal refractive index due to the electric field leaking from the neighboring segment electrodes.

In FIG. 16, the electric field at the position x=1.5 (when the width W of the separation portions is three times the thickness d of the liquid crystal, as the separation portions have segments on both sides) is about ⅔ of the electric field at the position x=1 (when the width W of the separation portions is two times the thickness d of the liquid crystal). Considering the fact that the aberrations are almost completely corrected when the width W of the separation portions is two times the thickness d of the liquid crystal, it can be assumed that the aberrations can be sufficiently corrected with the electric field leaking above the separation portions even when the width W of the separation portions is three times the thickness d of the liquid crystal.

The following is a discussion of the optical transmittance of an optical element. When the same voltage is applied to all segment electrodes, the refractive index of the portions of the liquid crystal that are influenced by the segment electrodes is different from the refractive index of the portions of the liquid crystal that are not influenced by the segment electrodes. Therefore, a portion of the incident light is diffracted, which lowers the optical transmittance of the optical element. Since in the optical element of the present embodiment all portions of the liquid crystal located above the separation potions are influenced by the segment electrodes, there is only a small decrease of the optical transmittance. The actual optical transmittance of the optical element 130 was measured, when setting the segment electrodes to 3V and the opposing electrodes to 0V. As a result, the optical transmittance of the optical element was 91% when the thickness d of the liquid crystal was 5 μm and the width W of the separation portions was 10 μm. When the thickness d of the liquid crystal was 5 μm and the width W of the separation portions was 5 μm, the optical transmittance of the optical element was 97%. Since the optical transmittance depends on the surface area of the separation portions, general statements are not possible, but from the above results, it can be seen that it is preferable that the relation between the thickness d of the liquid crystal and the width W of the separation portion is W≦d.

Thus, by controlling the voltage between the segment electrodes 133a to 133e and the opposing electrode 14 of the optical element 130, the refractive index of the liquid crystal 17 can be changed in every region. Consequently, the path length can be changed at any desired position of the liquid crystal 17 of the optical element 130. As shown in FIG. 14, the polarization direction of the light incident to the optical element 130, the orientation of the liquid crystal 17, and the radial direction of the optical recording medium are substantially parallel. Consequently, tilting of the optical recording medium results in a phase distribution (coma aberration) as shown in FIG. 25, and controlling the voltage applied to the segment electrodes 133a to 133e can correct the coma aberration by subjecting incident light to a phase distribution having the opposite polarity to the phase distribution shown in FIG. 25.

In particular, since the width W of the separation portions 132 in the optical element 130 is such that the entire liquid crystal (phase changing layer) 17 positioned above the separation portion 132 is influenced by the segment electrodes, the phase of the light passing the liquid crystal 17 above the separation portions 132 is appropriately controlled as well. Therefore, with this optical element 130, the effect of correcting incident light is particularly high. Moreover, since a sufficient correction can be attained without making the width of the separation portions 132 of this optical element 130 narrower than necessary, the optical element can be manufactured with good yield and at low cost.

It should be noted that the shape of the voltage applying electrode 131 shown in FIG. 14 is merely an example, and that electrodes with different shapes can be used as well, as long as the width W of the separation portion is below a certain value.

Moreover, it is also possible to form a voltage control electrode as explained for the first embodiment, or anti-reflective films as explained for the second embodiment in the optical element 130.

Fourth Example

The fourth embodiment illustrates yet another example of an optical element in accordance with the present invention.

Figure 17A:
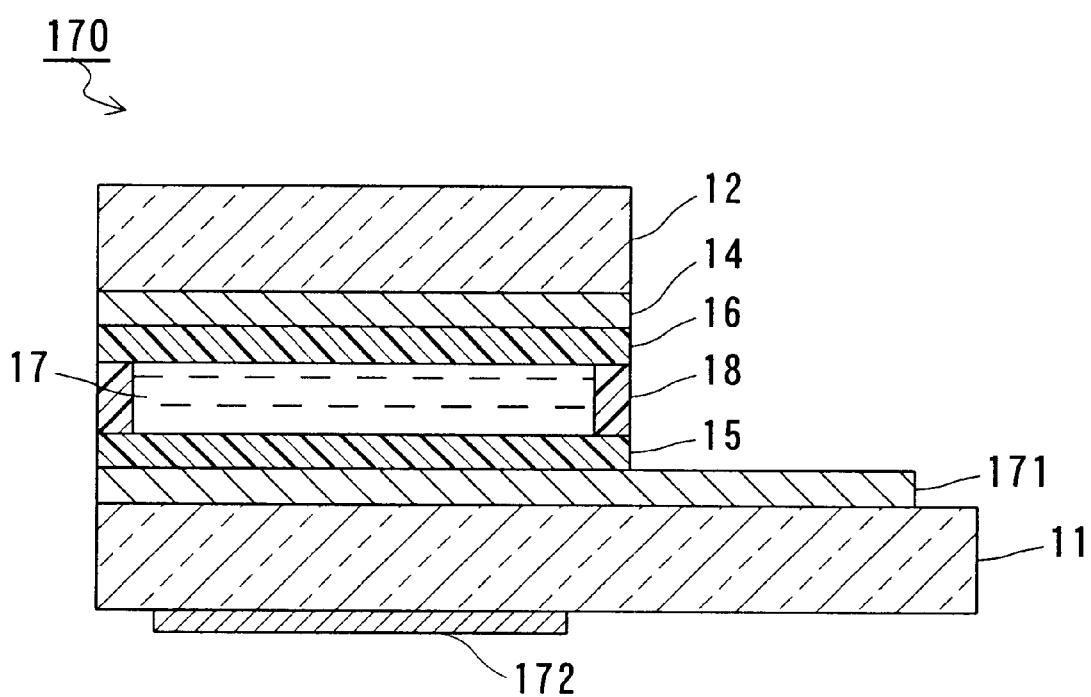
FIG. 17A is a cross-sectional drawing showing yet another optical element in accordance with the present invention.

FIG. 17A is a cross-sectional view of an optical element 170 of the fourth embodiment of the present invention.

Referring to FIG. 17A, the optical element 170 includes a first substrate 11, a second substrate 12 arranged substantially in parallel to the first substrate 11, a voltage applying electrode 171 arranged between the first substrate 11 and a liquid crystal 17, an opposing electrode 14 arranged substantially in parallel to the voltage applying electrode 171 and opposing the voltage applying electrode 171, a translucent resin film 15 formed so as to cover the voltage applying electrode 171, a translucent resin film 16 formed so as to cover the opposing electrode 14, a liquid crystal 17 arranged between the translucent resin films 15 and 16 (i.e., between the voltage applying electrode 171 and the opposing electrode 14), a sealing resin 18 arranged between the translucent resin films 15 and 16 and enclosing the liquid crystal 17, and a light-blocking film 172 formed on the main face on the outer side (away from the liquid crystal 17) of the first substrate 11.

Except for the voltage applying electrode 171 and the light-blocking film 172, all portions are the same as in the optical element 10 of the first embodiment, so that their explanation has been omitted.

The voltage applying electrode 171 applies the desired voltage to the liquid crystal 17 thereby controlling the phase of the light passing through the liquid crystal 17. The voltage applying electrode 171 is also divided by separation portions into a plurality of segment electrodes, like the voltage applying electrode 131 in FIG. 14, but the width of the separation portions of the voltage applying electrode 171 can be wider. The segment electrodes are translucent and can be made, for example, of ITO.

The light-blocking film 172 blocks a portion of the incident light. For example, a metal can be used for the light-blocking film, and to be specific, an aluminum film of 100 nm thickness can be used for it. In FIG. 17A, the light-blocking film 172 is shown to be formed on the first substrate 11, but the light-blocking film 172 can just as well be formed on the second substrate 12. The light-blocking film 172 can be formed, for example, by depositing a metal thin film, and eliminating unnecessary metal portions with a photolithography step and an etching step.

Figure 17B:
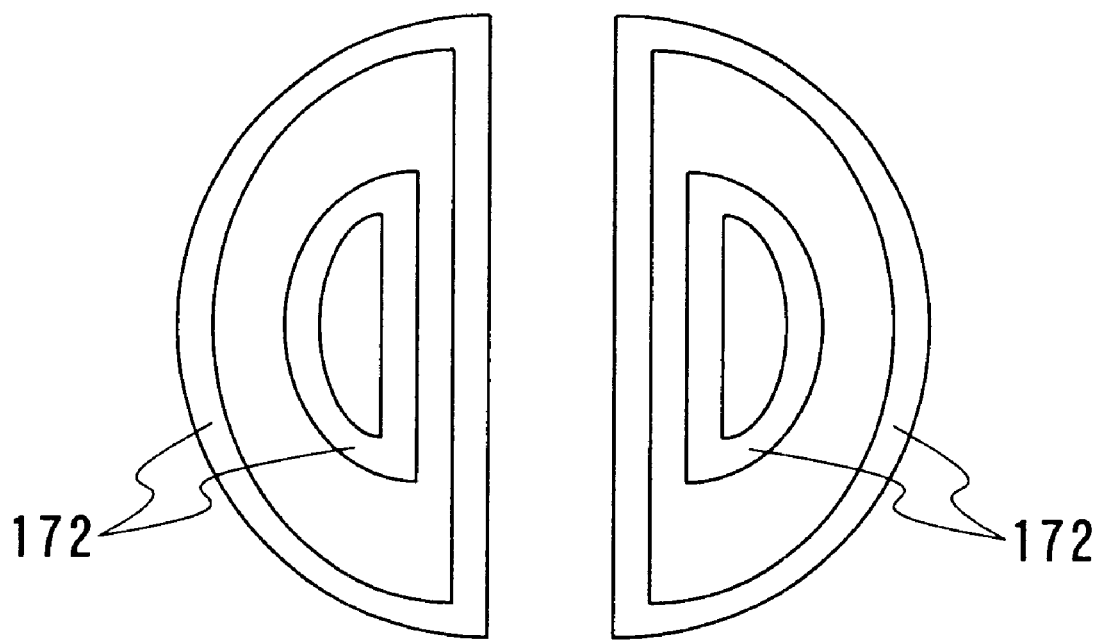
FIG. 17B is a top view showing an example of the light-blocking film in an optical element in accordance with the present invention.

FIG. 17B is a top view showing an example of the light-blocking film 172. In the light-blocking film 172 in FIG. 17B, the voltage applying electrode 171 has a similar pattern to the voltage applying electrode 131 in FIG. 14 (the width of the separation portion differs).

Referring to FIG. 17B, the light-blocking film 172 is formed at a position corresponding to the separation portions. That is to say, the light-blocking film 172 is provided on the light path of the portion of the light that passes through the separation portions.

As has been explained for the third embodiment, if the separation portions of the voltage applying electrode are too broad, the control of the liquid crystal 17 above the separation portions becomes insufficient, so that the phase of the light passing through this portion is not sufficiently controlled and aberrations are not sufficiently corrected. On the other hand, since in the optical element 170 light with uncontrolled phases is blocked by the light-blocking film 172, only light with an optimal phase passes through the optical element 170, and a sufficient correction of aberrations is performed.

When performing aberration correction for a tilt angle of 1° with an actual optical element 170 having a voltage control electrode 171 with broad separation portions and a light-blocking film 172, the jitter was reduced to 8%, which is a very good result. On the other hand, for the same case without the correction of aberrations, the jitter was 20%. Thus, it has been shown that with the optical element 170, the effect of good aberration correction can be attained.

In this manner, with the optical element 170 of the fourth embodiment, by blocking all the light passing through the separation portions of the voltage applying electrode 171, an optical element with good aberration correction can be obtained. Moreover, since the separation portions of the optical element 170 can be made wider, the optical element can be manufactured with good yield and at low cost.

The light-blocking film 172 can be made to block all the light passing through the separation portions of the segment electrodes, but it is also possible to let it block only a portion of this light. This means, since the liquid crystal 17 above the separation portions is influenced by the electric field leaking from the segment electrodes as explained for the third embodiment, aberrations can be sufficiently corrected by blocking only the light that passes through the portions that are not influenced by the electric field. If only a portion of the light passing through the separation portions is blocked, the light amount that can be utilized is increased, so that the jitter can be improved even further.

It should be understood that the shapes of the light-blocking films 172 shown in FIG. 17B are merely an example, and that the shape of the light-blocking films 172 can be adjusted to the shape of the separation portions of the segment electrode.

Moreover, it is also possible to form a voltage control electrode as explained in the first embodiment or anti-reflective films as explained in the second embodiment on the optical element 170.

Fifth Embodiment

The fifth embodiment illustrates an optical head using an optical element in accordance with the present invention.

Figure 18:
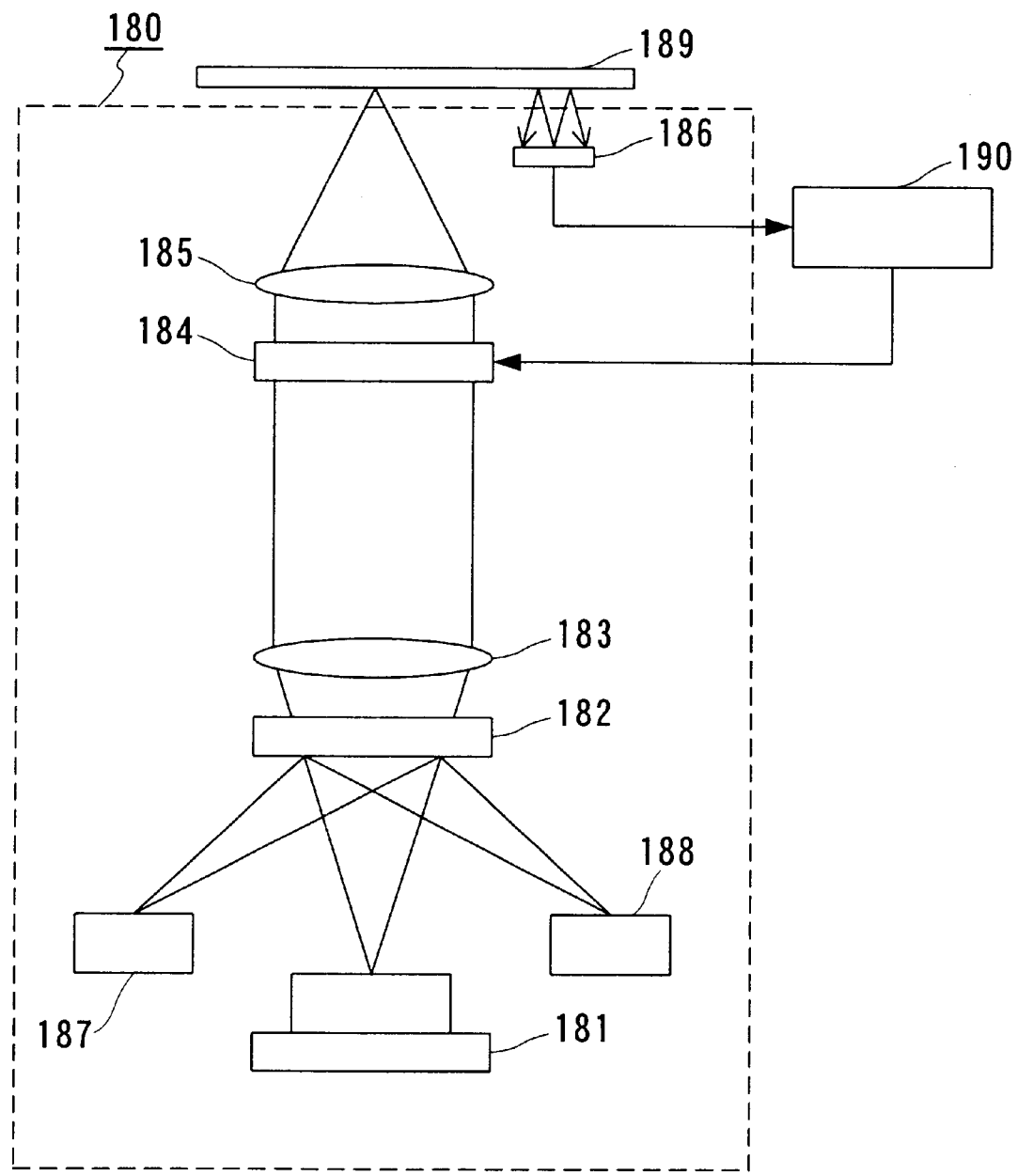
FIG. 18 is a schematic drawing showing an example of an optical head in accordance with the present invention.

FIG. 18 is a schematic drawing showing the configuration of an optical head 180 of the fifth embodiment.

Referring to FIG. 18, the optical head 180 includes a light source 181, a diffraction grating 182, a collimator lens 183, an optical element 184, an objective lens 185, a tilt sensor 186, and photo-detectors 187 and 188.

The light source 181 includes for example a semiconductor laser element and irradiates coherent light for recording and reproducing onto the recording layer of an optical recording medium 189.

The diffraction grating 182 can be made by forming photo-resist in the desired pattern on a glass substrate with photo-lithography, and etching the glass substrate. The diffraction grating 182 has a zero-order diffraction efficiency of about 50%, and a ±first-order diffraction efficiency of about 50%. In other words, the diffraction grating 182 functions as a separation means for separating light reflected from the optical recording medium 189 from the light path of light emitted by the light source 181.

The collimator lens 183 and the objective lens 185 constitute a focusing optical system.

For the optical element 184, any of the above-described optical elements of the first to fourth embodiment can be used. That is to say, the optical element 184 corrects aberrations by applying a different voltage to each segment electrode of the voltage applying electrode, so as to partially change the refractive index of the liquid crystal.

The objective lens 185 focuses light on the recording layer of the optical recording medium 189.

The tilt sensor 186 detects the tilt angle of the optical recording medium 189. Then, the tilt sensor 186 outputs a signal depending on the tilt angle of the optical recording medium to an optical element control circuit 190.

The optical element control circuit 190 applies an electrical signal (e.g. V1 and V2 in FIG. 3) to the optical element 184, depending on the output from the tilt sensor 186.

The photo-detector 187 detects the +1 order light that has been reflected at the recording layer of the optical recording medium 189 and diffracted by the diffraction grating 182 and converts it into an electric signal.

The photo-detector 188 detects the −1 order light that has been reflected at the recording layer of the optical recording medium 189 and diffracted by the diffraction grating 182 and converts it into an electric signal.

Referring to FIG. 18, the following explains the function of the optical head 180. A portion of the linearly polarized light emitted by the light source 181 passes the diffraction grating 182 and enters the collimator lens 183. The collimator lens 183 collimates this light into substantially parallel light, which enters the optical element 184.

If the optical recording medium 189 is tilted vertically with respect to the optical axis, the tilt sensor 186 outputs a signal corresponding to this tilt amount (tilt angle) for correcting the resulting wave-front aberrations, and this signal is given to the optical element control circuit 190. The optical element control circuit 190 outputs a signal necessary for correcting the wave-front aberrations caused by the tilt to the optical element 184. Consequently, the light entering the optical element 184 is subjected to a phase change so that the wave-front aberrations caused by the tilt of the optical recording medium 189 are corrected.

The objective lens 185 focuses the light that has passed the optical element 184 on the optical recording medium 189. The light focused on the optical recording medium 189 is subjected by the optical element 184 to a phase change for correcting the wave-front aberrations, so that a focus spot without aberration, in other words, one that is constricted to the diffraction limit, is formed on the optical recording medium 189.

The light reflected by the optical recording medium 189 is light that has wave-front aberrations depending the tilt of the optical recording medium 189, but these wave-front aberrations are again corrected by the optical element 184.

Reflected by the optical recording medium 189 and having passed through the optical element 184, the light passes the collimator lens 183, and is diffracted by the diffraction grating 182. Of the diffraction light diffracted by the diffraction grating 182, the +1 order light enters the photo-detector 187, and the −1 order light enters the photo-detector 188.

The photo-detector 187 outputs a focus error signal indicating how well the light is focused on the optical recording medium 189, and a tracking position error signal indicating the irradiation position. The focus error signal is outputted to a focus control means (not shown in the drawings). Based on the focus error signal, the focus control means regulates the position of the objective lens 185 on the optical axis in a manner that the light is always focused properly on the optical recording medium 189. The tracking error signal is outputted to a tracking control means (not shown in the drawings). Based on the tracking error signal, the tracking control means regulates the position of the objective lens 185 in a manner that the light is focused properly on the desired track of the optical recording medium 189.

The photo-detector 188 detects the recording information recorded on the optical recording medium 189.

Figure 19:
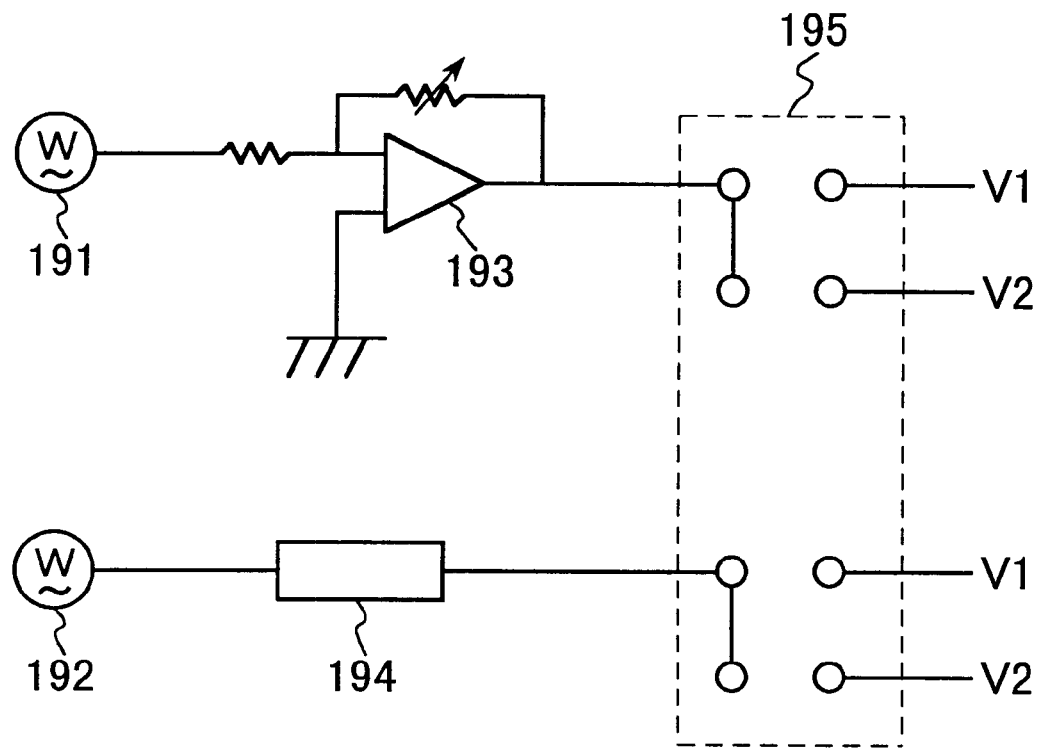
FIG. 19 is a circuit diagram showing an optical element control circuit used in an optical head of the present invention.

The following is an explanation of the optical element control circuit 190 for the case that the optical element 184 is an optical element as explained in the first or second embodiment. FIG. 19 shows a circuit diagram for such an optical element control circuit 190. The optical element control circuit 190 includes signal sources 191 and 192, an OP-amp 193, a delay circuit 194, and a switch 195.

The signal sources 191 and 192 output electrical signals to the voltage control electrode of the optical element 184. The electrical signals outputted by the signal sources 191 and 192 change in accordance with the voltages V1 and V2 applied to the voltage control electrode. The OP-amp 193 has a variable gain. The delay circuit 194 adjusts the phase of the signal from the signal source 192 so that the phases of the V1 and V2 are equal. The switch 195 passes the signals from the signal sources 191 and 192 on as the voltages V1 and V2 applied to the voltage control electrode. The switch 195 can toggle between the signal sources 191 and 192 corresponding to the voltages V1 and V2.

If, during the correction of the wave-front aberrations caused by the tilt of the optical recording medium 189, the direction of the tilt of the optical recording medium 189 is the same but the extent of the tilt differs, the wave-front aberrations can be corrected by changing the gain of the OP-amp 193. Moreover, if the warp direction of the optical recording medium 189 has reversed, the switch 195 toggles between the signal sources 191 and 192 corresponding to the voltages V1 and V2 and the gain of the OP-amp 193 is changed as appropriate to correct the wave-front aberrations.

Figure 20:
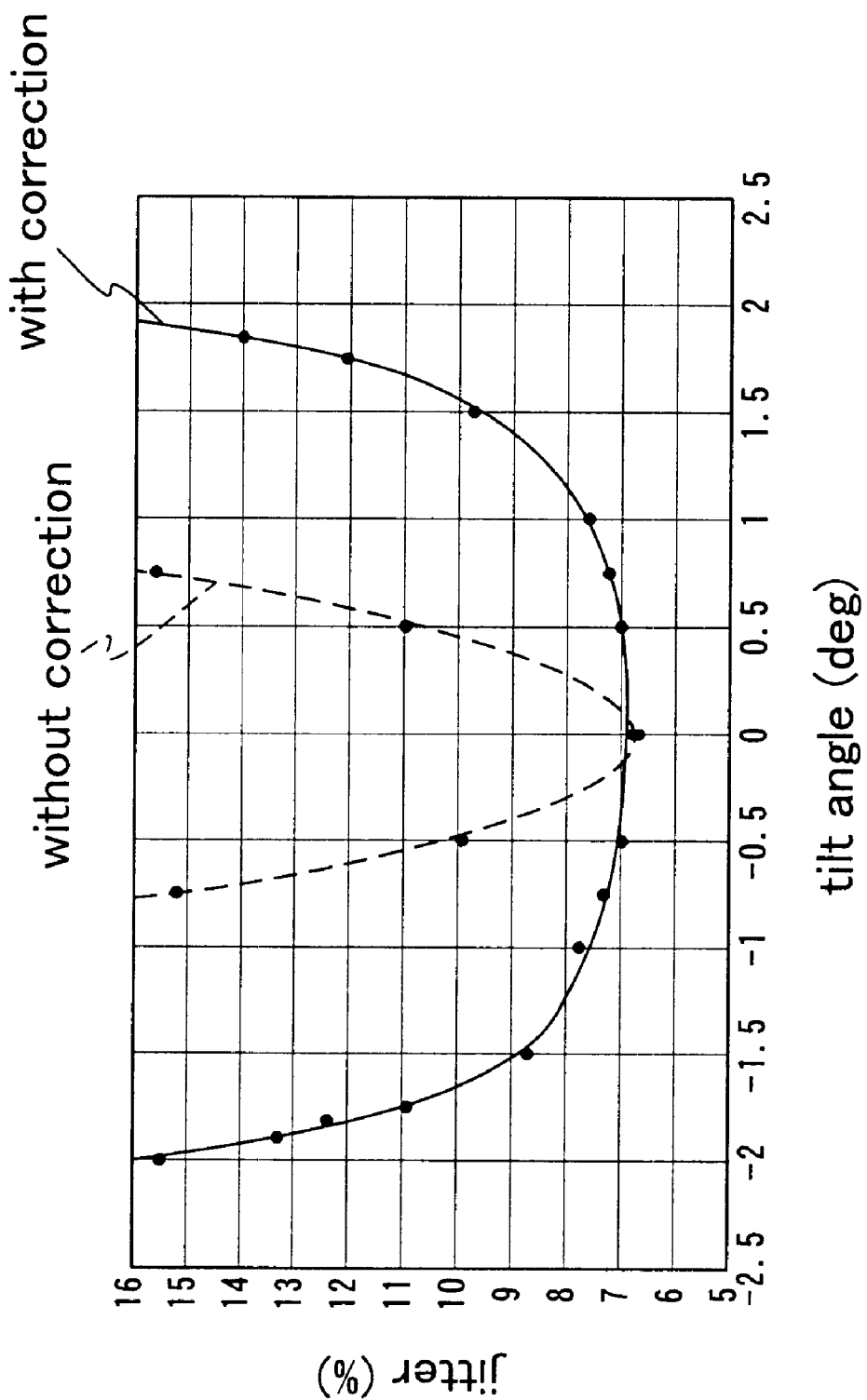
FIG. 20 is a graph showing the effect of aberration correction in an optical head in accordance with the present invention.

FIG. 20 shows the actually measured jitter for the case that the wave-front aberrations have been corrected with an optical element 10 in the optical head 180, in comparison to the case without such a correction. As becomes clear from FIG. 20, correcting the wave-front aberrations with the optical element 184 the jitter margin can be improved.

Thus, since the optical head 180 of the fifth embodiment includes an optical element in accordance with the present invention, an optical head can be attained that can read signals recorded on the optical recording medium with high reliability. Moreover, using an optical element in accordance with the present invention improves the jitter margin and the tilt margin of the optical head 180, so that the optical head can be manufactured easily and at low cost.

Moreover, if an optical element in accordance with the first or the second embodiment is used, the number of signals applied to the optical element 184 from outside can be reduced, so that an optical head can be attained that corrects aberrations, is small, and can be manufactured easily.

Sixth Embodiment

The sixth embodiment illustrates another example of an optical head in accordance with the present invention.

Figure 21:
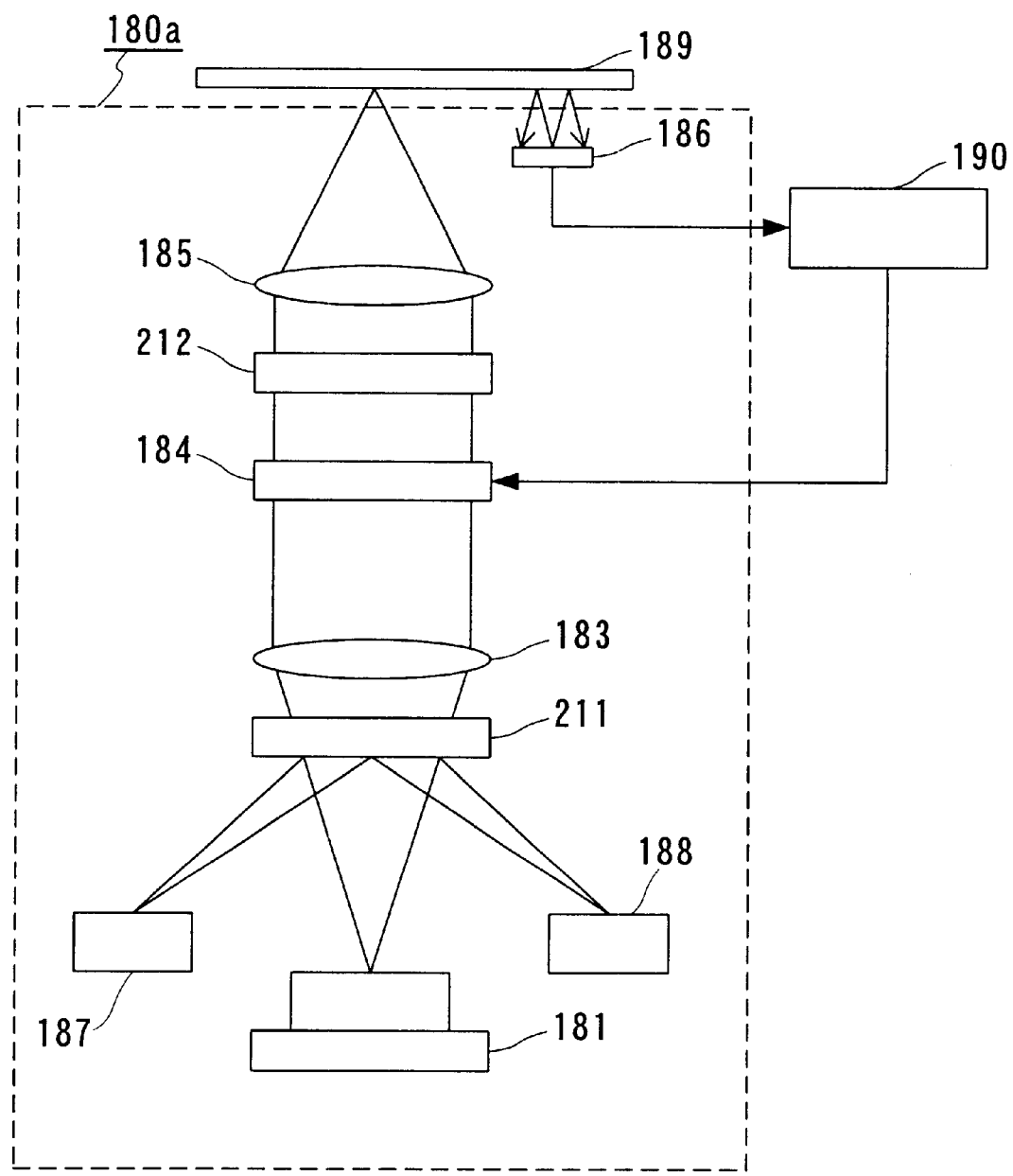
FIG. 21 is a schematic drawing showing another example of an optical head in accordance with the present invention.

FIG. 21 is a schematic drawing showing the configuration of an optical head 180a of the sixth embodiment.

Referring to FIG. 21a, the optical head 180a includes a light source 181, a collimator lens 183, an optical element 184, an objective lens 185, a tilt sensor 186, photo-detectors 187 and 188, a polarization. hologram 211, and a $\lambda/4$ plate 212. The polarization hologram 211 is arranged between the light source 181 and the collimator lens 183. Moreover, the $\lambda/4$ plate 212 is arranged between the optical element 184 and the optical recording medium 189.

Except for the polarization hologram 211 and the $\lambda/4$ plate 212, all parts are the same as in the fifth embodiment, so that their further explanation has been omitted. Moreover, the optical element 184 can be any of the optical elements explained in the first to fourth embodiments.

The polarization hologram 211 lets extraordinary light rays pass without changing them, and functions as a diffraction grating with respect to ordinary light rays. The polarization hologram 211 can be made, for example, by proton-exchanging a portion of a birefringent lithium niobate substrate and etching the proton-exchanged portion (see Tokkai Hei 6-27322).

The $\lambda/4$ plate 212 is a non-linear optical element converting linearly polarized light emitted by the light source 181 into circularly polarized light and converting light reflected at the recording layer of the optical recording medium 189 into linearly polarized light with a polarization direction that is different from the above-mentioned linearly polarized light. The $\lambda/4$ plate 212 can be made, for example, of a quartz. Instead of a $\lambda/4$ plate, it is also possible to use a N $\lambda/4$ plate (wherein N is an odd number of three or greater).

The operation of the optical head 180a will be explained with reference to FIG. 21. The linearly polarized light emitted by the light source 181 passes the polarization hologram 211 without being changed and enters the collimator lens 183. The collimator lens 183 collimates this light into substantially parallel light, which enters the optical element 184. If the optical recording medium 189 is tilted vertically with respect to the optical axis, the tilt sensor 186 outputs a signal corresponding to this tilt amount (tilt angle), which is given into the optical element control circuit 190. The optical element control circuit 190 outputs a signal necessary for correcting the wave-front aberrations caused by the tilt of the optical recording medium 189 to the optical element 184. Consequently, the light entering the optical element 184 is subjected to a phase change for correcting the wave-front aberrations caused by the tilt of the optical recording medium 189.

The light passing through the optical element 184 enters the $\lambda/4$ plate 212, which converts it from linearly polarized light into circularly polarized light. The objective lens 185 focuses this circularly polarized light on the optical recording medium 189, where it is reflected. Since light whose wave-front aberrations caused by tilting of the optical recording medium 189 have been corrected is focused with the objective lens 185, a focus spot without aberration, in other words, one that is constricted to the diffraction limit, is formed on the optical recording medium 189.

The light reflected from the optical recording medium 189 passes through the objective lens 185 and enters the $\lambda/4$ plate 212. The light entering the $\lambda/4$ plate 212 is converted by the $\lambda/4$ plate 212 from circularly polarized light into linearly polarized light. The linearly polarized light that has passed through the $\lambda/4$ plate 212 has a polarization direction that is perpendicular to the linearly polarized light that is emitted by the light source 181. This linearly polarized light passes the optical element 184 and the collimator lens 183, and is diffracted about 100% by the polarization hologram 211.

Then, the +1 order light enters the photo-detector 187, and the −1 order light enters the photo-detector 188.

The photo-detectors 187 and 188 as well as the focus control means (not shown in the drawings) function in the same manner as in the fifth embodiment, so that their explanation has been omitted here.

Thus, using an optical polarization system, the utilization ratio of light emitted from the light source 181 can be improved, facilitating the recording and reproducing of signals on a rewritable optical recording medium.

The following is an explanation of the position of the optical element 184 for correcting aberrations. Because the liquid crystal 17 of the optical element 184 is uniaxially birefringent, linearly polarized light that is substantially parallel to the orientation of the liquid crystal 17 has to be irradiated on the optical element 184 to correct aberrations (see FIG. 14). If the optical element 184 is arranged between the λ/4 plate 212 and the optical recording medium 189, circularly polarized light irradiated on the optical element 184 having the liquid crystal 17 (birefringent plate) changes the polarization between linear polarization and circular polarization according to the retardation of the liquid crystal 17. As a result, in the worst case, the light reflected by the optical recording medium 189 enters the polarization hologram 211 at the same polarization as the light emitted by the light source 181. In this case, the information signal recorded on the optical recording medium 189 cannot be reproduced, because no light enters the photo-detectors 187 and 188. Consequently, the optical element 184 should be placed between the light source 181 and the λ/4 plate 212. In other words, the λ/4 plate 212 should be placed between the optical element 184 and the optical recording medium.

With the optical head 180a of the sixth embodiment, the same effect can be attained as with the optical head 180 of the fifth embodiment. In addition, by placing the λ/4 plate 212 between the optical element 184 and the light source 181, the utilization ratio of the light can be improved, facilitating the recording and reproducing of signals on a rewritable optical recording medium.

Seventh Embodiment

The seventh embodiment illustrates an example of an optical recording and reproducing apparatus in accordance with the present invention. The optical recording and reproducing apparatus of the seventh embodiment is an apparatus for recording or reproducing (or recording and reproducing) signals on an optical recording medium.

Figure 22:
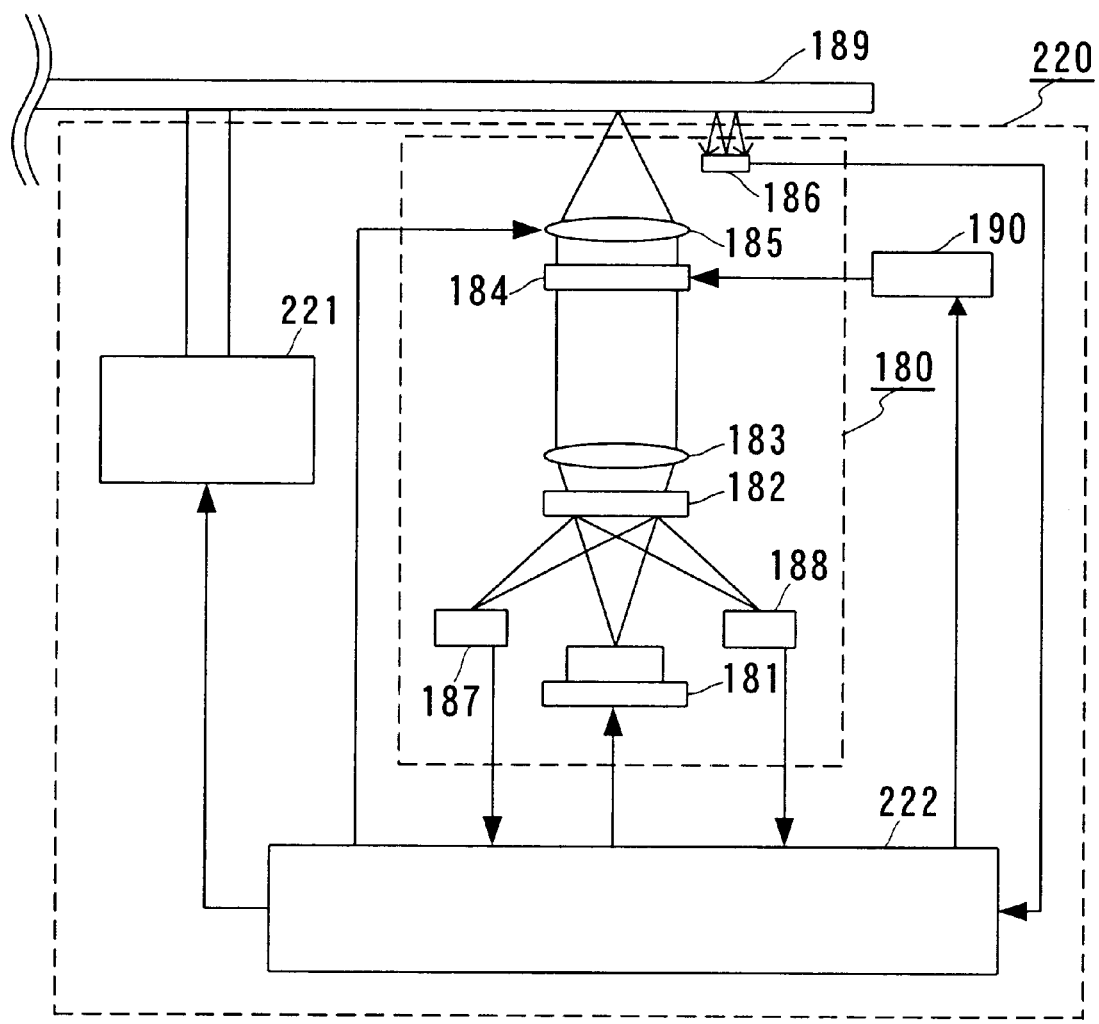
FIG. 22 is a schematic drawing showing an example of an optical recording and reproducing apparatus in accordance with the present invention.
Figure 23:
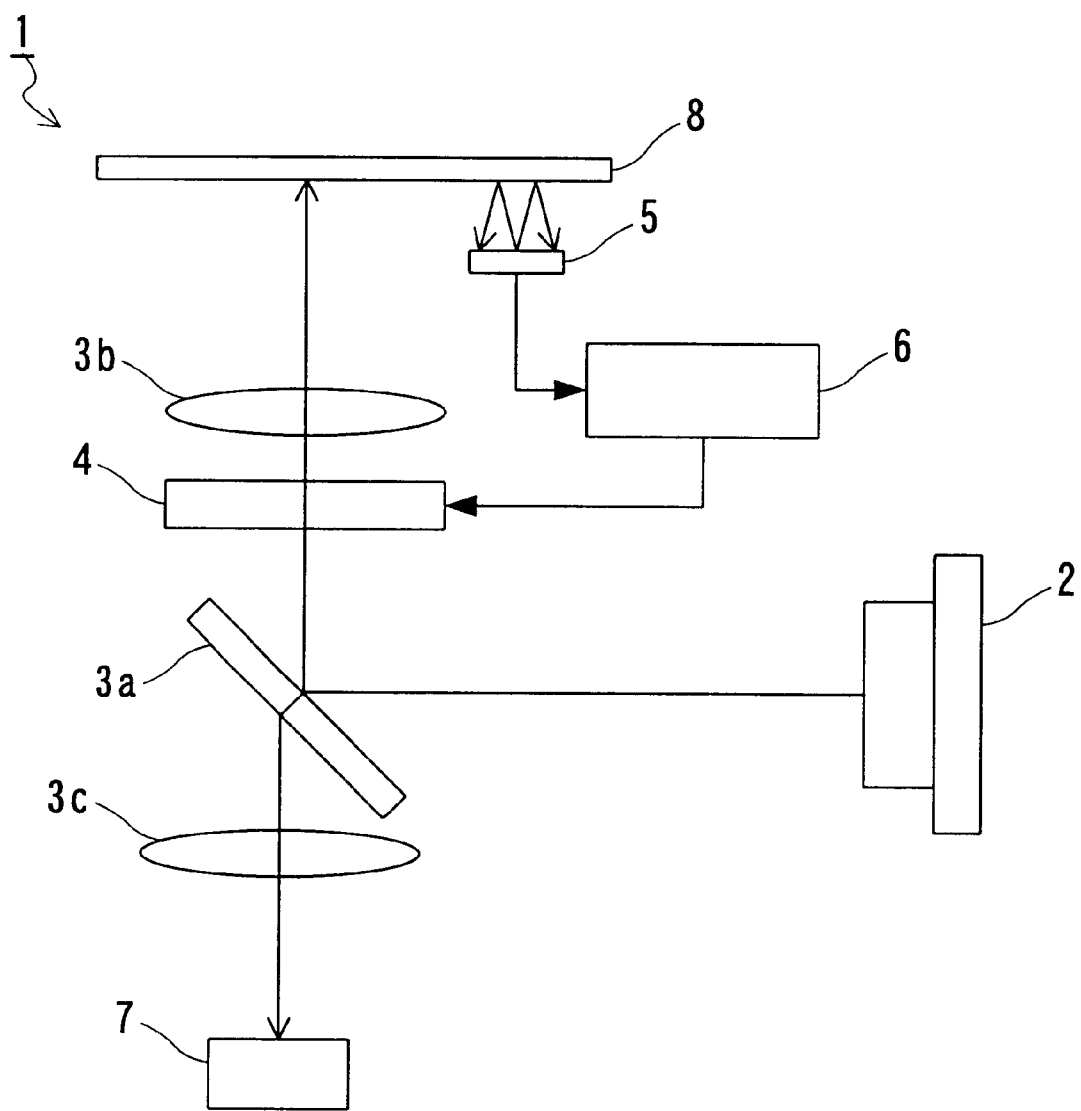
FIG. 23 is a schematic diagram showing an example of a conventional optical head.
Figure 24:
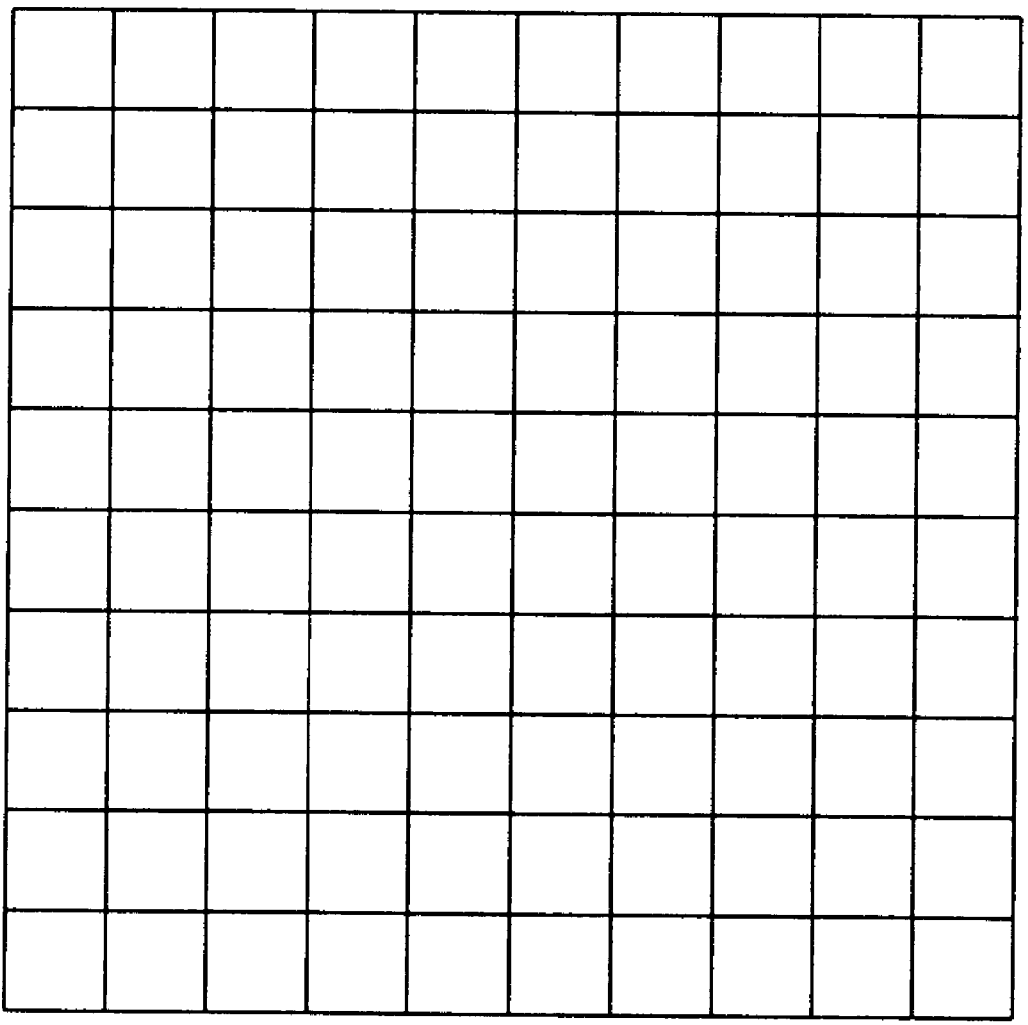
FIG. 24 is a schematic drawing showing an example of a segment electrodes in a conventional optical element.

FIG. 22 is a schematic drawing showing the configuration of an optical recording and reproducing apparatus 220 of the seventh embodiment. The optical recording and reproducing apparatus 220 includes an optical head 180, an optical element control circuit 190, a motor 221, and a processor 222. The optical head 180 is the one explained in the fifth embodiment, and includes an optical element 184 as explained in the first to fourth embodiment. Instead of the optical head 180, it is also possible to use an optical head 180a.

The optical head 180 and the optical element control circuit 190 are the same as in the fifth embodiment, so that their further explanation has been omitted.

The following is an explanation of how the optical recording and reproducing apparatus 220 operates. First, when an optical recording medium 189 is inserted into the optical recording and reproducing apparatus 220, the processor 222 outputs a signal to the motor 221 that causes the motor 221 to rotate. Then, the processor 222 drives the emission of light by the light source 181. The light emitted by the light source 181 is reflected by the optical recording medium 189 and enters the photo-detectors 187 and 188. The photo-detector 187 outputs to the processor 222 a focus error signal indicating how well the light is focused on the optical recording medium 189, and a tracking position error signal indicating the irradiation position. Based on these signals, the processor 222 outputs a signal controlling the objective lens 185, whereby the light emitted from the light source 181 is focused on the desired track on the optical recording medium 189. Also, based on the signal output from the photodetector 188, the processor 222 reproduces the information stored on the optical recording medium 189.

The following is an explanation of the control operation when the optical recording medium 189 is tilted. When the optical recording medium 189 is tilted, the tilt sensor 186 outputs a signal depending on the tilt of the optical recording medium 189 to the processor 222. Depending on the received signal, the processor 222 drives the optical element control circuit 190, whereby the control signal that is necessary for correcting coma aberration caused by the tilt of the optical recording medium 189 is output to the optical element 184 (for details, refer to the fifth and sixth embodiment). Thus, the information signal stored on the optical recording medium 189 can be reproduced properly, even when the optical recording medium 189 is tilted.

With the optical recording and reproducing apparatus 220 of the seventh embodiment, the coma aberration caused by the tilt of the optical recording medium 189 is corrected by an optical element in accordance with the present invention. Consequently, with the optical recording and reproducing apparatus 220, an optical recording and reproducing apparatus can be attained, wherein information signals recorded on the optical recording medium can be reproduced with good reliability. Moreover, using an optical element in accordance with the present invention, the tolerances with respect to tilting the optical recording medium 189 can be enlarged, so that an optical recording and reproducing apparatus can be manufactured easily and at low cost.

It should be noted that the above embodiments referred to the reproduction of information signals, but also in the case of recording information signals, the control of the optical element can be performed in the same manner as for the reproduction, so that it is also possible to record information signals with high reliability.

The above embodiments have been explained by way of examples, but the present invention is in no way limited to these examples, and can be applied to other embodiments based on the same technical idea as the present invention.

For example, the above examples related to the correction of radial tilt, but it is also possible to correct tangential tilt by turning the pattern of the segment electrodes 90°. Moreover, using two kinds of optical elements, it is possible to correct both radial tilt and tangential tilt.

Moreover, the above embodiments have been explained for the case that the optical element of the present invention is arranged in a parallel system between the collimator lens and the objective lens, but it also can be arranged in a divergent system between the light source and the collimator lens.

Moreover, the above embodiments have been explained for an optical head with an infinite system, but an optical head with a finite system without using a collimator lens is also possible.

Moreover, the above embodiments have been explained for the case that wave-front aberrations are corrected using the tilt amount that is detected with a tilt sensor during the reproduction of information stored on an optical recording medium. However, the present invention is not limited to this, and it is also possible to determine the relation between track position and tilt angle before the reproduction, and to correct the wave-front aberrations for each track position at the determined tilt angle.

Moreover, in the above embodiments, the light reflected from the optical recording medium is irradiated onto photo-detectors after separating it from the light path from the light source with a diffraction grating, but it also can be irradiated onto the photo-detectors after separating it from the light path from the light source with a half-mirror or the like.

Moreover, the above embodiments have been explained for the case that information is recorded only with light, but the same effects can be achieved if the optical element of the present invention is applied to an optomagnetic recording medium for recording information with light and magnetism.

Moreover, the above embodiments have been explained for the case that the optical recording medium is an optical disk, but it can be equally applied to a card-shaped recording medium, or any optical information recording and reproducing apparatus working in a similar manner.

Moreover, in the optical element of the first and second embodiment, it is also possible to connect a transistor to the voltage control electrode, to amplify a voltage applied from the outside. It is also possible to connect a phase-delaying circuit to the voltage control electrode to change the phase of the voltage applied to the voltage applying electrode.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, all changes that come within the meaning and range of equivalency of the claims are intended to be embraced therein.

What is claimed is:

1. An optical element comprising:
   a voltage applying electrode provided with a plurality of segment electrodes;
   an opposing electrode arranged substantially in parallel to the voltage applying electrode and opposing the voltage applying electrode; and
   a phase changing layer made of a phase changing material arranged between the voltage applying electrode and the opposing electrode;
   wherein a phase of light entering the phase changing layer is changed by changing a voltage between the voltage applying electrode and the opposing electrode; and
   the voltage applying electrode further comprises a voltage control electrode made of a conductive material, which divides a voltage applied from the outside with resistances of the conductive material and applies the divided voltages to the segment electrodes.

2. The optical element according to claim 1, wherein the phase changing material is a material whose refractive index changes depending on the voltage.

3. The optical element according to claim 2, wherein the phase changing material is a liquid crystal.

4. The optical element according to claim 1, wherein the phase changing material is a material whose volume changes depending on the voltage.

5. The optical element according to claim 4, wherein the phase changing material is PLZT.

6. The optical element according to claim 1, wherein the plurality of segment electrodes comprises a plurality of substantially semicircular electrodes arranged substantially in symmetry.

7. The optical element according to claim 1, wherein the plurality of segment electrodes comprises a plurality of electrodes partitioned into concentric rings.

8. The optical element according to claim 1, wherein the thickness $d_a$ of the voltage applying electrode is $$d_a=(2N_a+1)\lambda/2n_a$$

wherein $\lambda$ is the wavelength of the incident light, is an $N_a$ integer of) of 0 or greater, and $n_a$ is the refractive index of the voltage applying electrode.

9. The optical element according to claim 1, wherein the thickness $d_b$ of the opposing electrode is $$d_b=(2N_b+1)\lambda/2n_b$$

wherein $\lambda$ is the wavelength of the incident light, $N_b$ is an integer of 0 or greater, and $n_b$ is the refractive index of the opposing electrode.

10. The optical element according to claim 1, further comprising an anti-reflective film for preventing reflection of incident light.

11. An optical element comprising:
    a voltage applying electrode provided with a plurality of segment electrodes;
    an opposing electrode arranged substantially in parallel to the voltage applying electrode and opposing the voltage applying electrode; and
    a phase changing layer made of a phase changing material arranged between the voltage applying electrode and the opposing electrode;
    wherein a phase of light entering the phase changing layer is changed by changing a voltage between the voltage applying electrode and the opposing electrode;
    the voltage applying electrode is partitioned by separation portions into the plurality of segment electrodes; and
    the width of the separation portions is such that the entire phase changing layer located above the separation portions is influenced by the segment electrodes.

12. The optical element according to claim 11, wherein the width W of the separation portions and the thickness d of the phase changing layer satisfy the relation $W \leq 3d$.

13. An optical element comprising:
    a voltage applying electrode provided with a plurality of segment electrodes;
    an opposing electrode arranged substantially in parallel to the voltage applying electrode and opposing the voltage applying electrode;
    a phase changing layer made of a phase changing material arranged between the voltage applying electrode and the opposing electrode;
    wherein a phase of light entering the phase changing layer is changed by changing a voltage between the voltage applying electrode and the opposing electrode;
    the voltage applying electrode is partitioned by separation portions into the plurality of segment electrodes; and
    the optical element further comprises a light-blocking film blocking light from passing through the separation portions.

14. The optical element according to claim 13, wherein the light-blocking film is made of metal.

15. An optical head for optically reading information stored on an optical recording medium, the optical head comprising:

a light source; and an optical element arranged between the optical recording medium and the light source, the optical element comprising:

a voltage applying electrode provided with a plurality of segment electrodes;

an opposing electrode arranged substantially in parallel to the voltage applying electrode and opposing the voltage applying electrode; and a phase changing layer made of a phase changing material arranged between the voltage applying electrode and the opposing electrode;

wherein a phase of light entering the phase changing layer is changed by changing a voltage between the voltage applying electrode and the opposing electrode; and the voltage applying electrode further comprises a voltage control electrode made of a conductive material, which divides a voltage applied from the outside with resistances of the conductive material and applies the divided voltages to the segment electrodes.

16. The optical head according to claim 15, wherein the phase changing material of the optical element is a material whose refractive index changes depending on the voltage.

17. The optical head according to claim 16, wherein the phase changing material is a liquid crystal.

18. The optical head according to claim 15, wherein the phase changing material of the optical element is a material whose volume changes depending on the voltage.

19. The optical element according to claim 18, wherein the phase changing material is PLZT.

20. The optical head according to claim 15, wherein the plurality of segment electrodes comprises a plurality of substantially semicircular electrodes arranged substantially in symmetry.

21. The optical head according to claim 15, wherein the plurality of segment electrodes comprises a plurality of electrodes partitioned into concentric rings.

22. The optical head according to claim 15, wherein the thickness $d_a$ of the voltage applying electrode is $$d_a=(2N_a+1)\lambda/2n_a$$

wherein $\lambda$ is the wavelength of the incident light, $N_a$ is an integer of 0 or greater, and $n_a$ is the refractive index of the voltage applying electrode.

23. The optical head according to claim 15, wherein the thickness $d_b$ of the voltage applying electrode is $$d_b=(2N_b+1)\lambda/2n_b$$

wherein $\lambda$ is the wavelength of the incident light, $N_b$ is an integer of 0 or greater, and $n_b$ is the refractive index of the opposing electrode.

24. The optical head according to claim 15, further comprising an anti-reflective film for preventing reflection of incident light.

25. The optical head according to claim 15, further comprising a N $\lambda$/4 plate (wherein N is an odd number of one or greater) arranged between the optical recording medium and the optical element.

26. An optical head for optically reading information stored on an optical recording medium, the optical head comprising:

a light source; and an optical element arranged between the optical recording medium and the light source, the optical element comprising:

a voltage applying electrode provided with a plurality of segment electrodes;

an opposing electrode arranged substantially in parallel to the voltage applying electrode and opposing the voltage applying electrode; and a phase changing layer made of a phase changing material arranged between the voltage applying electrode and the opposing electrode;

wherein a phase of light entering the phase changing layer is changed by changing a voltage between the voltage applying electrode and the opposing electrode;

the voltage applying electrode is partitioned by separation portions into the plurality of segment electrodes; and the width of the separation portions is such that the entire phase changing layer located above the separation portions is influenced by the segment electrodes.

27. The optical head according to claim 26, wherein the width W of the separation portions and the thickness d of the phase changing layer satisfy the relation $W \leq 3d$.

28. An optical head for optically reading information stored on an optical recording medium, the optical head comprising:

a light source; and an optical element arranged between the optical recording medium and the light source, the optical element comprising:

a voltage applying electrode provided with a plurality of segment electrodes;

an opposing electrode arranged substantially in parallel to the voltage applying electrode and opposing the voltage applying electrode;

a phase changing layer made of a phase changing material arranged between the voltage applying electrode and the opposing electrode;

wherein a phase of light entering the phase changing layer is changed by changing a voltage between the voltage applying electrode and the opposing electrode;

the voltage applying electrode is partitioned by separation portions into the plurality of segment electrodes; and the optical element further comprises a light-blocking film blocking light from passing through the separation portions.

29. The optical head according to claim 28, wherein the light-blocking film is made of metal.

30. An optical reading and recording apparatus for recording or reproducing signals on an optical recording medium, the apparatus comprising:

an optical head for recording or reproducing signals on the optical recording medium, the optical head comprising a light source, and an optical element arranged between the optical recording medium and the light source, the optical element comprising:

a voltage applying electrode provided with a plurality of segment electrodes;

an opposing electrode arranged substantially in parallel to the voltage applying electrode and opposing the voltage applying electrode; and a phase changing layer made of a phase changing material arranged between the voltage applying electrode and the opposing electrode;

wherein a phase of light entering the phase changing layer is changed by changing a voltage between the voltage applying electrode and the opposing electrode; and the voltage applying electrode further comprises a voltage control electrode made of a conductive material, which divides a voltage applied from the outside with resistances of the conductive material and applies the divided voltages to the segment electrodes.

31. The apparatus according to claim 30, wherein the phase changing material of the optical element is a material whose refractive index changes depending on the voltage.

32. The apparatus according to claim 31, wherein the phase changing material is a liquid crystal.

33. The apparatus according to claim 30, wherein the phase changing material of the optical element is a material whose volume changes depending on the voltage.

34. The apparatus according to claim 33, wherein the phase changing material is PLZT.

35. The apparatus according to claim 30, wherein the plurality of segment electrodes comprises a plurality of substantially semicircular electrodes arranged substantially in symmetry.

36. The apparatus according to claim 30, wherein the plurality of segment electrodes comprises a plurality of electrodes partitioned into concentric rings.

37. The apparatus according to claim 30, wherein the thickness $d_a$ of the voltage applying electrode is $$d_a = (2N_a + 1)\lambda / 2n_a$$

wherein $\lambda$ is the wavelength of the incident light, is an $N_a$ integer of) of 0 or greater, and $n_a$ is the refractive index of the voltage applying electrode.

38. The apparatus according to claim 30, wherein the thickness $d_b$ of the opposing electrode is $$d_b = (2N_b + 1)\lambda / 2n_b$$

wherein $\lambda$ is the wavelength of the incident light, is an $N_b$ integer of) of 0 or greater, and $n_b$ is the refractive index of the voltage applying electrode.

39. The apparatus according to claim 30, wherein the optical element further comprises an anti-reflective film for preventing reflection of incident light.

40. The optical head according to claim 30, further comprising a N $\lambda/4$ plate (wherein N is an odd number of one or greater) arranged between the optical recording medium and the optical element.

41. An optical reading and recording apparatus for recording or reproducing signals on an optical recording medium, the apparatus comprising:
    an optical head for recording or reproducing signals on the optical recording medium, the optical head comprising a light source, and an optical element arranged between the optical recording medium and the light source, the optical element comprising: a voltage applying electrode provided with a plurality of segment electrodes;
    an opposing electrode arranged substantially in parallel to the voltage applying electrode and opposing the voltage applying electrode; and
    a phase changing layer made of a phase changing material arranged between the voltage applying electrode and the opposing electrode;
    wherein a phase of light entering the phase changing layer is changed by changing a voltage between the voltage applying electrode and the opposing electrode;
    the voltage applying electrode is partitioned by separation portions into the plurality of segment electrodes; and
    the width of the separation portions is such that the entire phase changing layer located above the separation portions is influenced by the segment electrodes.

42. The apparatus according to claim 41, wherein the width W of the separation portions and the thickness d of the phase changing layer satisfy the relation $W \leq 3d$.

43. An optical reading and recording apparatus for recording or reproducing signals on an optical recording medium, the apparatus comprising:
    an optical head for recording or reproducing signals on the optical recording medium, the optical head comprising a light source, and an optical element arranged between the optical recording medium and the light source, the optical element comprising: a voltage applying electrode provided with a plurality of segment electrodes;
    an opposing electrode arranged substantially in parallel to the voltage applying electrode and opposing the voltage applying electrode; and
    a phase changing layer made of a phase changing material arranged between the voltage applying electrode and the opposing electrode;
    wherein a phase of light entering the phase changing layer is changed by changing a voltage between the voltage applying electrode and the opposing electrode;
    the voltage applying electrode is partitioned by separation portions into the plurality of segment electrodes; and
    the optical element further comprises a light-blocking film blocking light from passing through the separation portions.

44. The apparatus according to claim 43, wherein the light-blocking film is made of metal.

* * * * *

UNITED STATES PATENT AND TRADEMARK OFFICE
CERTIFICATE OF CORRECTION

PATENT NO.    : 6,480,454 B1
DATED         : November 12, 2002
INVENTOR(S)   : Wada et al.

Page 1 of 1

It is certified that error appears in the above-identified patent and that said Letters Patent is hereby corrected as shown below:

Column 26,
Lines 12-13, "light, is an $N_a$ integer of) of 0 or greater," should read -- light, $N_a$ is an integer of 0 or greater, --
Lines 28-29, "light, is an $N_a$ integer of) of 0 or greater," should read -- light, $N_a$ is an integer of 0 or greater, --
Lines 35-36, "light, is an $N_b$ integer of) of 0 or greater," should read -- light, $N_b$ is an integer of 0 or greater, --

Signed and Sealed this

Second Day of December, 2003

JAMES E. ROGAN
*Director of the United States Patent and Trademark Office*